US012757189B2

(12) United States Patent
Liu et al.

(10) Patent No.: US 12,757,189 B2
(45) Date of Patent: Oct. 6, 2026

(54) RESOURCE CONFIGURATION METHOD AND NETWORK DEVICE

(71) Applicant: HUAWEI TECHNOLOGIES CO., LTD., Shenzhen (CN)

(72) Inventors: Fengwei Liu, Chengdu (CN); Jing Qiu, Chengdu (CN)

(73) Assignee: Huawei Technologies Co., LTD., Shenzhen (CN)

( * ) Notice: Subject to any disclaimer, the term of this patent is extended or adjusted under 35 U.S.C. 154(b) by 758 days.

(21) Appl. No.: 17/887,149

(22) Filed: Aug. 12, 2022

(65) Prior Publication Data

US 2022/0394737 A1 Dec. 8, 2022

Related U.S. Application Data

(63) Continuation of application No. PCT/CN2020/075264, filed on Feb. 14, 2020.

(51) Int. Cl.

*H04W 72/1263* (2023.01)
*H04W 72/21* (2023.01)
*H04W 72/53* (2023.01)

(52) U.S. Cl.

CPC ....... *H04W 72/1263* (2013.01); *H04W 72/21* (2023.01); *H04W 72/53* (2023.01)

(58) Field of Classification Search

CPC . H04W 72/1263; H04W 72/21; H04W 72/53; H04W 72/20; H04W 8/24; H04B 7/15542

See application file for complete search history.

(56) References Cited

U.S. PATENT DOCUMENTS

2020/0145997 A1* 5/2020 Luo .................. H04W 72/0446
2021/0143957 A1* 5/2021 Gao ...................... H04L 5/0053

(Continued)

FOREIGN PATENT DOCUMENTS

CN 110740021 A 1/2020
CN 110753397 A 2/2020

(Continued)

OTHER PUBLICATIONS

3GPP TS 38.213 V16.0.0, "3rd Generation Partnership Project; Technical Specification Group Radio Access Network; NR; Physical layer procedures for control (Release 16)," Dec. 2019, 146 pages.

(Continued)

*Primary Examiner* — Derrick W Ferris
*Assistant Examiner* — Jesse P. Samluk
(74) *Attorney, Agent, or Firm* — Fish & Richardson P.C.

(57) ABSTRACT

This application discloses example resource configuration methods and integrated access and backhaul (IAB) nodes. One example method includes sending, by a first node, first information and second information to a second node, where the first information indicates a resource multiplexing capability supported by one or more carriers of a mobile termination (MT) of the first node and one or more cells of a distributed unit (DU) of the first node, and the second information indicates a condition that needs to be met for the resource multiplexing capability supported by the one or more carriers of the MT. The resource multiplexing capability includes a capability 1, a capability 2, a capability 3, and a capability 4, where the capability 1, the capability 2, the capability 3, and the capability 4 indicate respectively whether the MT and the DU can send or receive signals simultaneously.

20 Claims, 6 Drawing Sheets

(56) References Cited

U.S. PATENT DOCUMENTS

| | | | | |
|---|---|---|---|---|
| 2021/0144719 | A1* | 5/2021 | Choi | H04L 5/0037 |
| 2021/0259051 | A1* | 8/2021 | Latheef | H04W 76/12 |
| 2023/0065102 | A1* | 3/2023 | You | H04W 84/04 |

FOREIGN PATENT DOCUMENTS

| | | | |
|---|---|---|---|
| WO | 2019190650 | A1 | 10/2019 |
| WO | 2020032594 | A1 | 2/2020 |

OTHER PUBLICATIONS

3GPP TS 38.214 V16.0.0, "3rd Generation Partnership Project; Technical Specification Group Radio Access Network; NR; Physical layer procedures for data (Release 16)," Dec. 2019, 147 pages.
3GPP TS 38.321 V15.8.0, "3rd Generation Partnership Project; Technical Specification Group Radio Access Network; NR; Medium Access Control (MAC) protocol specification (Release 15)," Dec. 2019, 78 pages.
3GPP TS 38.473 V16.0.0, "3rd Generation Partnership Project; Technical Specification Group Radio Access Network; NG-RAN; F1 application protocol (F1AP)(Release 16)," Dec. 2019, 239 pages.
International Search Report and Written Opinion in International Appln. No. PCT/CN2020/075264, mailed on Nov. 18, 2020, 21 pages (with English translation).
AT&T, "Summary #1 of 7.2.3.1—Mechanisms for Resource Multiplexing Among Backhaul and Access links," 3GPP TSG RAN WG1 #99, R1-1913321, Reno, USA, Nov. 18-22, 2019, 15 pages.
Ericsson, "Remaining Issues on IAB Resource Configuration and Multiplexing," 3GPP TSG-RAN WG1 Meeting #99, R1-1912133, Reno, USA, Nov. 18-22, 2019, 5 pages.
WI Rapporteur (Qualcomm Incorporated), "RAN1 Agreements for Rel-16 IAB," 3GPP TSG RAN WG1 Meeting #99, R1-1913600, Reno, USA, Nov. 18-22, 2019, 29 pages.
Ericsson, "IAB Resource Configuration and Multiplexing," 3GPP TSG-RAN WG1 Meeting #98bis, R1-1910902, Chongqing, China, Oct. 14-20, 2019, 9 pages.
Extended European Search Report in European Appln No. 20918387.0, dated Dec. 23, 2022, 13 pages.

* cited by examiner

| Subframe number | 0 | 1 | 2 | 3 | 4 | 5 | 6 | 7 | 8 | 9 |
|---|---|---|---|---|---|---|---|---|---|---|
| Downlink backhaul of an IAB node | N | N | D | N | D | N | D | N | N | N |
| Downlink access of the IAB node | D | D | N | D | N | D | N | D | D | D |

FIG. 5

Slot #n

| | | |
|---|---|---|
| H/S/NA | H/S/NA | H/S/NA |
| Downlink | Flexible | Uplink |

FIG. 6

| Slot number | 0 | 1 | 2 |
|---|---|---|---|
| Parent node | D | D | D |
| MT of an IAB node | D | D | D |
| DU of the IAB node | NA | D-H | D-S |
| Child node | D | D | D |

FIG. 7

RESOURCE CONFIGURATION METHOD AND NETWORK DEVICE

CROSS-REFERENCE TO RELATED APPLICATIONS

This application is a continuation of International Application No. PCT/CN2020/075264, filed on Feb. 14, 2020, the disclosure of which is hereby incorporated by reference in its entirety.

TECHNICAL FIELD

Embodiments of this application relate to the field of communication technologies, and in particular, to a resource configuration method and a network device.

BACKGROUND

With continuous development of mobile communication technologies, spectrum resources are increasingly constrained. Base stations will be deployed more densely in the future to improve spectrum utilization. In addition, dense deployment may further avoid coverage holes. In a conventional cellular network architecture, a base station is connected to a core network through an optical fiber. However, in many scenarios, deployment costs of optical fibers are high. To reduce costs, a connection between a wireless relay node (relay node, RN) and the core network may be established through a wireless backhaul link.

Generally, the RN establishes a wireless backhaul link (which may be referred to as a parent backhaul link (parent BackHaul link)) with one or more parent nodes: and the RN establishes a wireless backhaul link (which may be referred to as a child backhaul link (child BackHaul link)) with one or more child nodes. The parent node of the RN may be a base station, or may be another RN; and the child node of the RN may be a terminal, or may be another RN. Considering a high bandwidth of a future wireless network, an integrated access and backhaul (integrated access and backhaul, IAB) solution is considered to be introduced to 5G new radio (new radio, NR), to further reduce deployment costs and improve deployment flexibility. Therefore, an integrated access and backhaul RN, namely, an IAB node, is introduced. As shown in FIG. 1, the IAB node establishes the parent backhaul link with the parent node, establishes the child backhaul link with the child node, and establishes an access link with user equipment (user equipment, UE).

The IAB node may include two parts of functional units: a mobile termination (mobile terminal, MT) and a distributed unit (Distributed unit, DU). The MT is configured for communication between the IAB node and the parent node, and the DU is configured for communication between the IAB node and the child node or the UE. The MT and the DU may communicate with the parent node or the child node of the IAB node by using a backhaul link resource configured for the IAB node by an access network device (for example, the base station) of the IAB node. Generally, resource multiplexing manners may include time division multiplexing, space division multiplexing, full duplex, and the like. However, in a conventional technology, there is no non-time division resource multiplexing solution between the MT and the DU that are of the IAB node.

SUMMARY

This application provides a resource configuration method and a network device. A transmission resource can be pertinently configured and indicated when a resource multiplexing manner of non-time division multiplexing is applied to an IAB node.

To achieve the foregoing objective, the following technical solutions are used in embodiments of this application.

According to a first aspect, a resource configuration method is provided. The method includes: A first node sends first information and second information to a second node. The first information is used to indicate a resource multiplexing capability supported by one or more carriers of a mobile termination MT of the first node and one or more cells of a distributed unit DU of the first node, and the second information is used to indicate a condition that needs to be met for the resource multiplexing capability supported by the one or more carriers of the MT. The resource multiplexing capability includes a capability 1, a capability 2, a capability 3, and a capability 4, where the capability 1 indicates that the MT and the DU can send a signal simultaneously, the capability 2 indicates that the DU can receive a signal while the MT sends a signal, the capability 3 indicates that the DU can send a signal while the MT receives a signal, and the capability 4 indicates that the MT and the DU can receive a signal simultaneously.

In the technical solution provided in the first aspect, the first node reports, to the second node, the resource multiplexing capability of the MT and the DU that are of the IAB node and a condition that needs to be met for the resource multiplexing capability supported by the MT and the DU, so that the second node can pertinently configure and indicate a transmission resource based on the capability of the MT and the DU that are of the IAB node, a transmission parameter requirement, and the like. In this way, resource utilization of the first node in communication is improved, and communication efficiency is improved.

In a possible implementation, the resource configuration method provided in this application may further include: The first node receives first configuration information from the second node, where the first configuration information is used to indicate a transmission resource of the MT. The transmission resource of the MT enables the MT of the first node to support one of the capability 1, the capability 2, the capability 3, or the capability 4, and the transmission resource of the MT enables the MT of the first node to meet the condition required for the capability 1, the capability 2, the capability 3, or the capability 4. The second node can pertinently configure and indicate the transmission resource based on the capability of the MT and the DU that are of the IAB node, the transmission parameter requirement, and the like. In this way, the resource utilization of the first node in communication is improved, and the communication efficiency is improved.

In a possible implementation, the condition that is indicated by the second information and that needs to be met for the resource multiplexing capability supported by the one or more carriers of the MT specifically includes one or more of the following conditions: a downlink receive power of the MT set in a specific interval; a maximum quantity of demodulation reference signal DMRS ports for downlink scheduling of the MT, a maximum quantity of DMRS ports for uplink scheduling of the MT; a timing mode for uplink scheduling of the MT set to a specific mode; an uplink transmit beam ID supported by the MT; or a downlink receive beam ID supported by the MT. The first node reports a requirement of the resource multiplexing capability supported by the carriers of the MT on one or more MT transmission parameters such as the transmission power, the DMRS port, the timing mode, or a beam, so that the second node pertinently configures and indicates the transmission resource for the first node.

In a possible implementation, a condition that is further indicated by the second information and that needs to be met for the resource multiplexing capability supported by the DU of the first node specifically includes one or more of the following conditions: an uplink receive power of the DU set in a specific interval; a downlink transmit power of the DU set in a specific interval; a timing mode for uplink receiving of the DU set to a specific mode; a downlink transmit beam ID supported by the DU; or an uplink receive beam ID supported by the DU. The first node reports a requirement of the resource multiplexing capability supported by the carriers of the DU on one or more DU transmission parameters such as the transmission power, the timing mode, or a beam, so that the second node pertinently configures and indicates the transmission resource for the first node.

In a possible implementation, the resource configuration method provided in this application may further include: The first node receives second configuration information from the second node. The second configuration information includes: a DU cell ID indicated by downlink control information DCI; a location of DU cell resource availability information indicated by the DU cell ID in the DCI; and the DU cell resource availability information indicated by the DU cell ID. The second node indicates DU cell resource availability to the first node, so that the first node determines MT carrier resource availability based on the DCI and the DU cell resource availability.

In a possible implementation, the second configuration information further includes an MT carrier ID indicated by the DCI. The second node indicates, in the second configuration information, an MT carrier corresponding to a DU cell, so that the first node performs resource availability analysis based on the MT carrier indicated by the second configuration information.

In a possible implementation, the resource configuration method provided in this application may further include: The first node receives the DCI from the second node, where the DCI is used to indicate an availability state of a soft resource, and availability states of the soft resource include an availability state 1 and an availability state 2. The availability state 1 indicates that the second node does not use a first carrier of the MT to perform backhaul link scheduling, the availability state 2 indicates that the second node is to use the first carrier of the MT to perform backhaul link scheduling, and the first carrier is any carrier of the MT. The enhanced DCI indicates two different availability states, so that resource availability configuration may be performed more flexibly.

In a possible implementation, the second node is a parent node or a donor node of the first node.

According to a second aspect, a resource configuration method is provided. The method includes: A second node receives first information and second information from a first node, where the first information is used to indicate a resource multiplexing capability supported by one or more carriers of a mobile termination MT of the first node and one or more cells of a distributed unit DU of the first node, and the second information is used to indicate a condition that needs to be met for the resource multiplexing capability supported by the one or more carriers of the MT. The resource multiplexing capability includes a capability 1, a capability 2, a capability 3, and a capability 4, where the capability 1 indicates that the MT and the DU can send a signal simultaneously, the capability 2 indicates that the DU can receive a signal while the MT sends a signal, the capability 3 indicates that the DU can send a signal while the MT receives a signal, and the capability 4 indicates that the MT and the DU can receive a signal simultaneously.

In the technical solution provided in the second aspect, the first node reports, to the second node, the resource multiplexing capability of the MT and the DU that are of the IAB node and a condition that needs to be met for the resource multiplexing capability supported by the MT and the DU, so that the second node can pertinently configure and indicate a transmission resource based on the capability of the MT and the DU that are of the IAB node, a transmission parameter requirement, and the like. In this way, resource utilization of the first node in communication is improved, and communication efficiency is improved.

In a possible implementation, the resource configuration method provided in this application may further include: The second node sends first configuration information to the first node, where the first configuration information is used to indicate a transmission resource of the MT. The transmission resource of the MT enables the MT of the first node to support one of the capability 1, the capability 2, the capability 3, or the capability 4, and the transmission resource of the MT enables the MT of the first node to meet the condition required for the capability 1, the capability 2, the capability 3, or the capability 4. The second node can pertinently configure and indicate the transmission resource based on the capability of the MT and the DU that are of the IAB node, the transmission parameter requirement, and the like. In this way, the resource utilization of the first node in communication is improved, and the communication efficiency is improved.

In a possible implementation, the condition that is indicated by the second information and that needs to be met for the resource multiplexing capability supported by the one or more carriers of the MT specifically includes one or more of the following conditions: a downlink receive power of the MT set in a specific interval; a maximum quantity of demodulation reference signal DMRS ports for downlink scheduling of the MT; a maximum quantity of DMRS ports for uplink scheduling of the MT; a timing mode for uplink scheduling of the MT set to a specific mode; an uplink transmit beam ID supported by the MT; or a downlink receive beam ID supported by the MT. The first node reports a requirement of the resource multiplexing capability supported by the carriers of the MT on one or more MT transmission parameters such as the transmission power, the DMRS port, the timing mode, or a beam, so that the second node pertinently configures and indicates the transmission resource for the first node.

In a possible implementation, a condition that is further indicated by the second information and that needs to be met for the resource multiplexing capability supported by the DU of the first node specifically includes one or more of the following conditions: an uplink receive power of the DU set in a specific interval; a downlink transmit power of the DU set in a specific interval; a timing mode for uplink receiving of the DU set to a specific mode; a downlink transmit beam ID supported by the DU; or an uplink receive beam ID supported by the DU. The first node reports a requirement of the resource multiplexing capability supported by the carriers of the DU on one or more DU transmission parameters such as the transmission power, the timing mode, or a beam, so that the second node pertinently configures and indicates the transmission resource for the first node.

In a possible implementation, the resource configuration method provided in this application may further include:

The second node sends second configuration information to the first node. The second configuration information includes: a DU cell ID indicated by downlink control information DCI; a location of DU cell resource availability information indicated by the DU cell ID in the DCI; and the DU cell resource availability information indicated by the DU cell ID. The second node indicates DU cell resource availability to the first node, so that the first node determines MT carrier resource availability based on the DCI and the DU cell resource availability.

In a possible implementation, the second configuration information further includes an MT carrier ID indicated by the DCI. The second node indicates, in the second configuration information, an MT carrier corresponding to a DU cell, so that the first node performs resource availability analysis based on the MT carrier indicated by the second configuration information.

In a possible implementation, the resource configuration method provided in this application may further include: The second node sends, to the first node, the DCI that is used to indicate an availability state of a soft resource, and availability states of the soft resource include an availability state 1 and an availability state 2. The availability state 1 indicates that the second node does not use a first carrier of the MT to perform backhaul link scheduling, the availability state 2 indicates that the second node is to use the first carrier of the MT to perform backhaul link scheduling, and the first carrier is any carrier of the MT. The enhanced DCI indicates two different availability states, so that resource availability configuration may be performed more flexibly.

In a possible implementation, the second node is a parent node or a donor node of the first node.

According to a third aspect, a resource configuration method is provided. The method includes: A first node receives second configuration information from a second node. The second configuration information includes: a DU cell ID indicated by downlink control information DCI; a location of DU cell resource availability information indicated by the DU cell ID in the DCI; and the DU cell resource availability information indicated by the DU cell ID.

In the technical solution provided in the third aspect, the second node indicates DU cell resource availability to the first node, so that the first node determines MT carrier resource availability based on the DCI and the DU cell resource availability.

In a possible implementation, the second configuration information further includes an MT carrier ID indicated by the DCI. The second node indicates, in the second configuration information, an MT carrier corresponding to a DU cell, so that the first node performs resource availability analysis based on the MT carrier indicated by the second configuration information.

In a possible implementation, the resource configuration method provided in this application may further include: The first node receives the DCI from the second node, where the DCI is used to indicate an availability state of a soft resource, and availability states of the soft resource include an availability state 1 and an availability state 2. The availability state 1 indicates that the second node does not use a first carrier of the MT to perform backhaul link scheduling, the availability state 2 indicates that the second node is to use the first carrier of the MT to perform backhaul link scheduling, and the first carrier is any carrier of the MT. The enhanced DCI indicates two different availability states, so that resource availability configuration may be performed more flexibly.

In a possible implementation, the second node is a parent node or a donor node of the first node.

According to a fourth aspect, a resource configuration method is provided. The method includes: A second node sends second configuration information to a first node. The second configuration information includes: a DU cell ID indicated by downlink control information DCI; a location of DU cell resource availability information indicated by the DU cell ID in the DCI; and the DU cell resource availability information indicated by the DU cell ID.

In the technical solution provided in the fourth aspect, the second node indicates DU cell resource availability to the first node, so that the first node determines MT carrier resource availability based on the DCI and the DU cell resource availability.

In a possible implementation, the second configuration information further includes an MT carrier ID indicated by the DCI. The second node indicates, in the second configuration information, an MT carrier corresponding to a DU cell, so that the first node performs resource availability analysis based on the MT carrier indicated by the second configuration information.

In a possible implementation, the resource configuration method provided in this application may further include: The second node sends, to the first node, the DCI that is used to indicate an availability state of a soft resource, and availability states of the soft resource include an availability state 1 and an availability state 2. The availability state 1 indicates that the second node does not use a first carrier of the MT to perform backhaul link scheduling, the availability state 2 indicates that the second node is to use the first carrier of the MT to perform backhaul link scheduling, and the first carrier is any carrier of the MT. The enhanced DCI indicates two different availability states, so that resource availability configuration may be performed more flexibly.

In a possible implementation, the second node is a parent node or a donor node of the first node.

According to a fifth aspect, a first node is provided. The first node includes a sending unit, configured to send first information and second information to a second node. The first information is used to indicate a resource multiplexing capability supported by one or more carriers of a mobile termination MT of the first node and one or more cells of a distributed unit DU of the first node, and the second information is used to indicate a condition that needs to be met for the resource multiplexing capability supported by the one or more carriers of the MT. The resource multiplexing capability includes a capability 1, a capability 2, a capability 3, and a capability 4, where the capability 1 indicates that the MT and the DU can send a signal simultaneously, the capability 2 indicates that the DU can receive a signal while the MT sends a signal, the capability 3 indicates that the DU can send a signal while the MT receives a signal, and the capability 4 indicates that the MT and the DU can receive a signal simultaneously.

In the technical solution provided in the fifth aspect, the first node reports, to the second node, the resource multiplexing capability of the MT and the DU that are of the IAB node and a condition that needs to be met for the resource multiplexing capability supported by the MT and the DU, so that the second node can pertinently configure and indicate a transmission resource based on the capability of the MT and the DU that are of the IAB node, a transmission parameter requirement, and the like. In this way, resource utilization of the first node in communication is improved, and communication efficiency is improved.

In a possible implementation, the first node provided in this application further includes a receiving unit, configured to receive first configuration information from the second node, where the first configuration information is used to indicate a transmission resource of the MT. The transmission resource of the MT enables the MT of the first node to support one of the capability 1, the capability 2, the capability 3, or the capability 4, and the transmission resource of the MT enables the MT of the first node to meet the condition required for the capability 1, the capability 2, the capability 3, or the capability 4. The second node can pertinently configure and indicate the transmission resource based on the capability of the MT and the DU that are of the IAB node, the transmission parameter requirement, and the like. In this way, the resource utilization of the first node in communication is improved, and the communication efficiency is improved.

In a possible implementation, the condition that is indicated by the second information and that needs to be met for the resource multiplexing capability supported by the one or more carriers of the MT specifically includes one or more of the following conditions: a downlink receive power of the MT set in a specific interval; a maximum quantity of demodulation reference signal DMRS ports for downlink scheduling of the MT, a maximum quantity of DMRS ports for uplink scheduling of the MT, a timing mode for uplink scheduling of the MT set to a specific mode; an uplink transmit beam ID supported by the MT; or a downlink receive beam ID supported by the MT. The first node reports a requirement of the resource multiplexing capability supported by the carriers of the MT on one or more MT transmission parameters such as the transmission power, the DMRS port, the timing mode, or a beam, so that the second node pertinently configures and indicates the transmission resource for the first node.

In a possible implementation, a condition that is further indicated by the second information and that needs to be met for the resource multiplexing capability supported by the DU of the first node specifically includes one or more of the following conditions: an uplink receive power of the DU set in a specific interval; a downlink transmit power of the DU set in a specific interval; a timing mode for uplink receiving of the DU set to a specific mode; a downlink transmit beam ID supported by the DU; or an uplink receive beam ID supported by the DU. The first node reports a requirement of the resource multiplexing capability supported by the carriers of the DU on one or more DU transmission parameters such as the transmission power, the timing mode, or a beam, so that the second node pertinently configures and indicates the transmission resource for the first node.

In a possible implementation, the receiving unit of the first node is further configured to receive second configuration information from the second node. The second configuration information includes: a DU cell ID indicated by downlink control information DCI; a location of DU cell resource availability information indicated by the DU cell ID in the DCI; and the DU cell resource availability information indicated by the DU cell ID. The second node indicates DU cell resource availability to the first node, so that the first node determines MT carrier resource availability based on the DCI and the DU cell resource availability. In a possible implementation, the second configuration information further includes an MT carrier ID indicated by the DCI. The second node indicates, in the second configuration information, an MT carrier corresponding to a DU cell, so that the first node performs resource availability analysis based on the MT carrier indicated by the second configuration information.

In a possible implementation, the receiving unit of the first node is further configured to receive the DCI from the second node, where the DCI is used to indicate an availability state of a soft resource, and availability states of the soft resource include an availability state 1 and an availability state 2. The availability state 1 indicates that the second node does not use a first carrier of the MT to perform backhaul link scheduling, the availability state 2 indicates that the second node is to use the first carrier of the MT to perform backhaul link scheduling, and the first carrier is any carrier of the MT. The enhanced DCI indicates two different availability states, so that resource availability configuration may be performed more flexibly.

In a possible implementation, the second node is a parent node or a donor node of the first node.

According to a sixth aspect, a first node is provided. The first node includes a receiving unit, configured to receive second configuration information from a second node. The second configuration information includes: a DU cell ID indicated by downlink control information DCI; a location of DU cell resource availability information indicated by the DU cell ID in the DCI; and the DU cell resource availability information indicated by the DU cell ID.

In the technical solution provided in the sixth aspect, the second node indicates DU cell resource availability to the first node, so that the first node determines MT carrier resource availability based on the DCI and the DU cell resource availability.

In a possible implementation, the second configuration information further includes an MT carrier ID indicated by the DCI. The second node indicates, in the second configuration information, an MT carrier corresponding to a DU cell, so that the first node performs resource availability analysis based on the MT carrier indicated by the second configuration information.

In a possible implementation, the receiving unit of the first node is further configured to receive the DCI from the second node, where the DCI is used to indicate an availability state of a soft resource, and availability states of the soft resource include an availability state 1 and an availability state 2. The availability state 1 indicates that the second node does not use a first carrier of the MT to perform backhaul link scheduling, the availability state 2 indicates that the second node is to use the first carrier of the MT to perform backhaul link scheduling, and the first carrier is any carrier of the MT. The enhanced DCI indicates two different availability states, so that resource availability configuration may be performed more flexibly.

In a possible implementation, the second node is a parent node or a donor node of the first node.

According to a seventh aspect, a second node is provided. The second node includes a receiving unit, configured to receive first information and second information from a first node. The first information is used to indicate a resource multiplexing capability supported by one or more carriers of a mobile termination MT of the first node and one or more cells of a distributed unit DU of the first node, and the second information is used to indicate a condition that needs to be met for the resource multiplexing capability supported by the one or more carriers of the MT. The resource multiplexing capability includes a capability 1, a capability 2, a capability 3, and a capability 4, where the capability 1 indicates that the MT and the DU can send a signal simultaneously, the capability 2 indicates that the DU can receive a signal while the MT sends a signal, the capability 3 indicates that the DU can send a signal while the MT receives a signal, and the capability 4 indicates that the MT and the DU can receive a signal simultaneously.

In the technical solution provided in the seventh aspect, the first node reports, to the second node, the resource multiplexing capability of the MT and the DU that are of the IAB node and a condition that needs to be met for the resource multiplexing capability supported by the MT and the DU, so that the second node can pertinently configure and indicate a transmission resource based on the capability of the MT and the DU that are of the IAB node, a transmission parameter requirement, and the like. In this way, resource utilization of the first node in communication is improved, and communication efficiency is improved.

In a possible implementation, the second node provided in this application may further include a sending unit, configured to send first configuration information to the first node, where the first configuration information is used to indicate a transmission resource of the MT. The transmission resource of the MT enables the MT of the first node to support one of the capability 1, the capability 2, the capability 3, or the capability 4, and the transmission resource of the MT enables the MT of the first node to meet the condition required for the capability 1, the capability 2, the capability 3, or the capability 4. The second node can pertinently configure and indicate the transmission resource based on the capability of the MT and the DU that are of the TAB node, the transmission parameter requirement, and the like. In this way, the resource utilization of the first node in communication is improved, and the communication efficiency is improved.

In a possible implementation, the condition that is indicated by the second information and that needs to be met for the resource multiplexing capability supported by the one or more carriers of the MT specifically includes one or more of the following conditions: a downlink receive power of the MT set in a specific interval; a maximum quantity of demodulation reference signal DMRS ports for downlink scheduling of the MT; a maximum quantity of DMRS ports for uplink scheduling of the MT; a timing mode for uplink scheduling of the MT set to a specific mode; an uplink transmit beam ID supported by the MT; or a downlink receive beam ID supported by the MT. The first node reports a requirement of the resource multiplexing capability supported by the carriers of the MT on one or more MT transmission parameters such as the transmission power, the DMRS port, the timing mode, or a beam, so that the second node pertinently configures and indicates the transmission resource for the first node.

In a possible implementation, a condition that is further indicated by the second information and that needs to be met for the resource multiplexing capability supported by the DU of the first node specifically includes one or more of the following conditions: an uplink receive power of the DU set in a specific interval; a downlink transmit power of the DU set in a specific interval; a timing mode for uplink receiving of the DU set to a specific mode; a downlink transmit beam ID supported by the DU; or an uplink receive beam ID supported by the DU. The first node reports a requirement of the resource multiplexing capability supported by the carriers of the DU on one or more DU transmission parameters such as the transmission power, the timing mode, or a beam, so that the second node pertinently configures and indicates the transmission resource for the first node.

In a possible implementation, the sending unit of the second node is further configured to send second configuration information to a first node. The second configuration information includes: a DU cell ID indicated by downlink control information DCI; a location of DU cell resource availability information indicated by the DU cell ID in the DCI; and the DU cell resource availability information indicated by the DU cell ID. The second node indicates DU cell resource availability to the first node, so that the first node determines MT carrier resource availability based on the DCI and the DU cell resource availability.

In a possible implementation, the second configuration information further includes an MT carrier ID indicated by the DCI. The second node indicates, in the second configuration information, an MT carrier corresponding to a DU cell, so that the first node performs resource availability analysis based on the MT carrier indicated by the second configuration information.

In a possible implementation, the sending unit of the second node is further configured to send, to the first node, the DCI that is used to indicate an availability state of a soft resource, and availability states of the soft resource include an availability state 1 and an availability state 2. The availability state 1 indicates that the second node does not use a first carrier of the MT to perform backhaul link scheduling, the availability state 2 indicates that the second node is to use the first carrier of the MT to perform backhaul link scheduling, and the first carrier is any carrier of the MT. The enhanced DCI indicates two different availability states, so that resource availability configuration may be performed more flexibly.

In a possible implementation, the second node is a parent node or a donor node of the first node.

According to an eighth aspect, a second node is provided. The second node includes a sending unit, configured to send second configuration information to a first node. The second configuration information includes: a DU cell ID indicated by downlink control information DCI; a location of DU cell resource availability information indicated by the DU cell ID in the DCI; and the DU cell resource availability information indicated by the DU cell ID.

In the technical solution provided in the eighth aspect, the second node indicates DU cell resource availability to the first node, so that the first node determines MT carrier resource availability based on the DCI and the DU cell resource availability.

In a possible implementation, the second configuration information further includes an MT carrier ID indicated by the DCI. The second node indicates, in the second configuration information, an MT carrier corresponding to a DU cell, so that the first node performs resource availability analysis based on the MT carrier indicated by the second configuration information.

In a possible implementation, the sending unit of the second node is further configured to send, to the first node, the DCI that is used to indicate an availability state of a soft resource, and availability states of the soft resource include an availability state 1 and an availability state 2. The availability state 1 indicates that the second node does not use a first carrier of the MT to perform backhaul link scheduling, the availability state 2 indicates that the second node is to use the first carrier of the MT to perform backhaul link scheduling, and the first carrier is any carrier of the MT. The enhanced DCI indicates two different availability states, so that resource availability configuration may be performed more flexibly.

In a possible implementation, the second node is a parent node or a donor node of the first node.

According to a ninth aspect, a first node is provided. The first node includes: a memory, configured to store computer program code, where the computer program code includes instructions; a radio frequency circuit, configured to: send and receive a radio signal; and a processor, configured to execute the instructions, so that the first node performs the resource configuration method according to any one of the possible implementations of the first aspect or the third aspect.

According to a tenth aspect, a second node is provided. The second node includes: a memory, configured to store computer program code, where the computer program code includes instructions; a radio frequency circuit, configured to: send and receive a radio signal; and a processor, configured to execute the instructions, so that the first node performs the resource configuration method according to any one of the possible implementations of the second aspect or the fourth aspect.

According to an eleventh aspect, a communication system is provided. The communication system includes the first node in any one of the possible implementations of the fifth aspect, the sixth aspect, or the ninth aspect, and the second node in any one of the possible implementations of the seventh aspect, the eighth aspect, or the tenth aspect. The communication system is configured to implement the resource configuration method according to any one of the possible implementations of the first aspect, the second aspect, the third aspect, or the fourth aspect.

According to a twelfth aspect, a computer-readable storage medium is provided. The computer-readable storage medium stores computer-executable instructions; and when the computer-executable instructions are executed by a processor, the resource configuration method according to any one of the possible implementations of the first aspect, the second aspect, the third aspect, or the fourth aspect is implemented.

According to a thirteenth aspect, a chip system is provided. The chip system includes a processor and a memory. The memory stores instructions; and when the instructions are executed by the processor, the resource configuration method according to any one of the possible implementations of the first aspect, the second aspect, the third aspect, or the fourth aspect is implemented. The chip system may include a chip, or may include a chip and another discrete component.

According to a fourteenth aspect, a computer program product is provided. When the computer program product runs on a computer, the resource configuration method according to any one of the possible implementations of the first aspect, the second aspect, the third aspect, or the fourth aspect is implemented.

BRIEF DESCRIPTION OF DRAWINGS

FIG. 5 is an example diagram of downlink backhaul link resource allocation in an LTE relay system according to an embodiment of this application;

FIG. 6 is a schematic diagram of resource attribute configuration in a slot according to an embodiment of this application;

FIG. 7 is an example diagram of MT resource and DU resource allocation in an NR relay system according to an embodiment of this application;

DESCRIPTION OF EMBODIMENTS

The following describes technical solutions in this application with reference to the drawings.

A communication system to which embodiments of this application are applicable includes but is not limited to: a narrowband internet of things (narrow band internet of things, NB-IoT) system, a wireless local area network (wireless local access network, WLAN) system, a long term evolution (long term evolution, LTE) system, a 5th generation mobile communication system (5th generation mobile network or 5th generation wireless system, 5G), also referred to as a new radio (new radio, NR) system, a communication system after 5G, for example, a 6G system, a device-to-device (device to device, D2D) communication system, or the Internet of Vehicles.

A 5G communication system is used as an example. Considering a high bandwidth of a future wireless network, an integrated access and backhaul (integrated access and backhaul, IAB) solution is considered to be introduced to 5G new radio (new radio, NR), to further reduce deployment costs and improve deployment flexibility. Therefore, an integrated access and backhaul relay is introduced. In this application, a relay node supporting integrated access and backhaul is referred to as an JAB node (IAB node) to be distinguished from a long term evolution (long term evolution, LTE) relay. A system that includes the IAB node is also referred to as a relay system.

Figure 2:
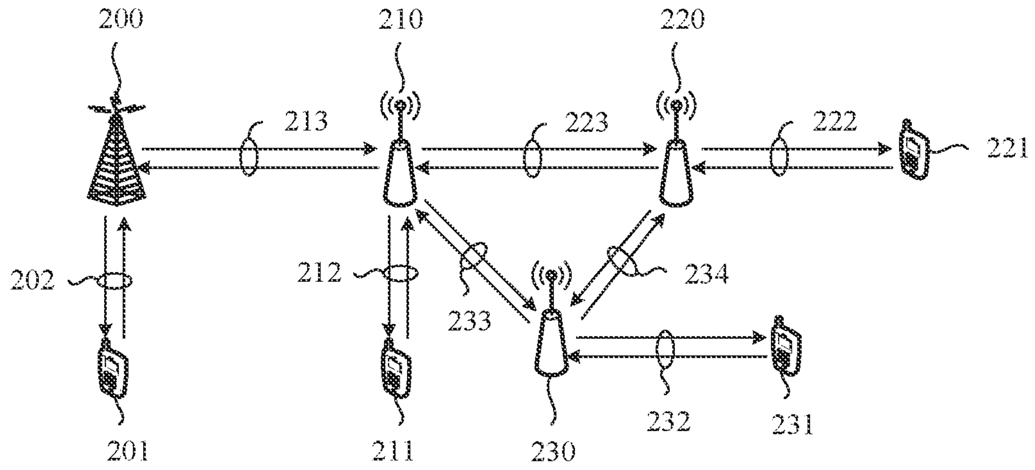
FIG. 2 is a schematic diagram of a structure of an integrated access and backhaul IAB system according to an embodiment of this application.

FIG. 2 is a schematic diagram of a structure of an integrated access and backhaul IAB system to which an embodiment of this application is applicable. As shown in FIG. 2, the integrated access and backhaul IAB system may include one or more IAB systems. The IAB system includes at least one base station 200, one or more terminal devices (terminals) 201 served by the base station 200, one or more IAB nodes, and one or more terminal devices 211 served by the JAB node 210. Usually, the base station 200 is referred to as a donor next generation NodeB (donor next generation NodeB, DgNB). The IAB node 210 is connected to the base station 200 through a wireless backhaul link 213. In this application, the donor next generation NodeB is also referred to as a donor node.

For example, the donor node in embodiments of this application may be divided into a central unit (central unit, CU) and at least one distributed unit (distributed unit, DU). As a logical node in a 5G gNB, the CU may be configured to manage or control the at least one DU. In other words, the CU is connected with the at least one DU. In this structure, protocol layers of a radio access network device in a communication system may be split (split). Some protocol layer functions are set on the CU, remaining protocol layer functions are set on the DU, and the CU centrally controls the DU. For example, the radio access network device is a gNB. Protocol layers of the gNB include a radio resource control (radio resource control, RRC) layer, a service data adaptation protocol (service data adaptation protocol, SDAP) layer, a packet data convergence protocol (packet data convergence protocol, PDCP) layer, a radio link control (radio link control, RLC) layer, a media access control (media access control, MAC) layer, and a physical layer. For example, the CU may be configured to implement functions of the RRC layer, the SDAP layer, and the PDCP layer, and the DU may be configured to implement functions of the RLC layer, the MAC layer, and the physical layer. Protocol stacks included in the CU and the DU are not specifically limited in embodiments of this application. The CU and the DU may be defined and connected based on an F1AP interface protocol.

A base station in this application includes but is not limited to an evolved NodeB (evolved node base, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband Unit, BBU), an eLTE (evolved LTE, eLTE) base station, an NR base station (next generation NodeB, gNB), a transmission reception point (transmission reception point, TRP), and the like. The terminal device includes but is not limited to any one of user equipment (user equipment, UE), a mobile station, an access terminal, a subscriber unit, a subscriber station, a mobile station, a remote station, a remote terminal, a mobile device, a terminal, a wireless communication device, a user agent, a station (station, ST) in a wireless local access network (wireless local access network, WLAN), a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device, another processing device connected to a wireless modem, a vehicle-mounted device, a wearable device, a mobile station in a future 5G network, a terminal device in a future evolved public land mobile network (public land mobile network, PLMN) network, and the like.

It should be noted that in this application, the IAB node is a specific name of the relay node, and constitutes no limitation on the solutions in embodiments of this application. The IAB node in this application may be one of the foregoing base stations or terminal devices that have a forwarding function, or may be an independent device form. For example, the IAB node in this application may also be referred to as a relay node (relay node, RN), a transmission reception point (transmission reception point), a relay transmission reception point (relaying TRP), or the like.

As shown in FIG. 2, the integrated access and backhaul system may further include a plurality of another IAB nodes, for example, an IAB node 220 and an JAB node 230. The IAB node 220 is connected to the IAB node 210 through a wireless backhaul link 223 to access a network, and the IAB node 230 is connected to the IAB node 210 through a wireless backhaul link 233 to access the network. The IAB node 220 serves one or more terminal devices 221, and the TAB node 230 serves one or more terminal devices 231. In FIG. 2, both the IAB node 210 and the IAB node 220 are connected to the network through wireless backhaul links.

In this application, the wireless backhaul link is viewed from the perspective of the relay node. For example, the wireless backhaul link 213 is a backhaul link of the IAB node 210, and the wireless backhaul link 223 is a backhaul link of the TAB node 220. As shown in FIG. 2, an JAB node may be connected to another JAB node through a wireless backhaul link, to be connected to the network. For example, the IAB node 220 may be connected to the IAB node 210 through the wireless backhaul link 223. In addition, the relay node may be connected to the network via a plurality of wireless relay nodes. It should be understood that in this application, the IAB node is used only for a purpose of description, and does not indicate that the solutions of this application are used only in an NR scenario. In this application, the JAB node may be any node or device that has a relay function. It should be understood that the JAB node and the relay node that are used in this application have a same meaning.

For ease of understanding, concepts and terms that may appear in this application are explained below.

1. A parent node is a node that provides a wireless backhaul link resource. For example, the IAB node 210 is referred to as a parent node of the IAB node 220. It should be understood that the parent node may be an TAB node, a donor next generation NodeB (for example, a donor node), a network device, or the like. This is not limited herein.
2. A child node is a node that uses a backhaul link resource to transmit data to a network or receive data from the network. For example, the TAB node 220 is referred to as a child node of the JAB node 210, and the terminal device 231 may be referred to as a child node of the TAB node 230. The network is a core network or a network, for example, the Internet or a dedicated network, above another access network.
3. An access link (access link) is a radio link that is used when a node (for example, the IAB node 210) communicates with a child node (for example, the terminal device 211) of the node, and includes an uplink transmission link and a downlink transmission link. Uplink transmission on the access link is also referred to as uplink transmission of the access link, and downlink transmission on the access link is also referred to as downlink transmission of the access link. The node includes but is not limited to the foregoing TAB node.
4. A backhaul link (backhaul link) is a radio link that is used when a node (for example, the IAB node 210) communicates with a parent node (for example, the base station 200) of the node, and includes an uplink transmission link and a downlink transmission link. Uplink transmission on the backhaul link is also referred to as uplink transmission of the backhaul link, and downlink transmission on the backhaul link is also referred to as downlink transmission of the backhaul link. The node includes but is not limited to the foregoing TAB node.

In this application, the IAB node may usually be divided into two parts: a mobile termination (mobile termination, MT) and a distributed unit (distributed unit, DU). The MT may be defined as a component similar to UE, and the DU may be defined as a component similar to a base station. In IAB, the MT and the DU are referred to as functions (or modules) residing on the IAB node. The MT is configured for communication between the IAB node and a parent node and the DU is configured for communication between the TAB node and a child node.

Figure 3:
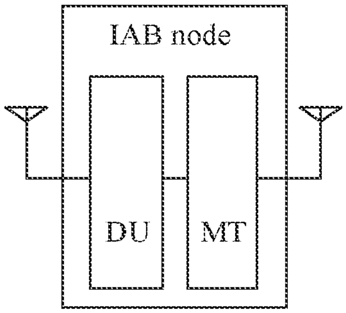
FIG. 3 is a schematic diagram of a structure of an TAB node according to an embodiment of this application.

In this application, both the MT and the DU of the IAB node have a complete transceiver unit, and there is an interface between the MT and the DU. However, it should be noted that the MT and the DU are logical modules. In practice, the MT and the DU may share some submodules, for example, a transceiver antenna and a baseband processing unit, as shown in FIG. 3.

Figure 1:
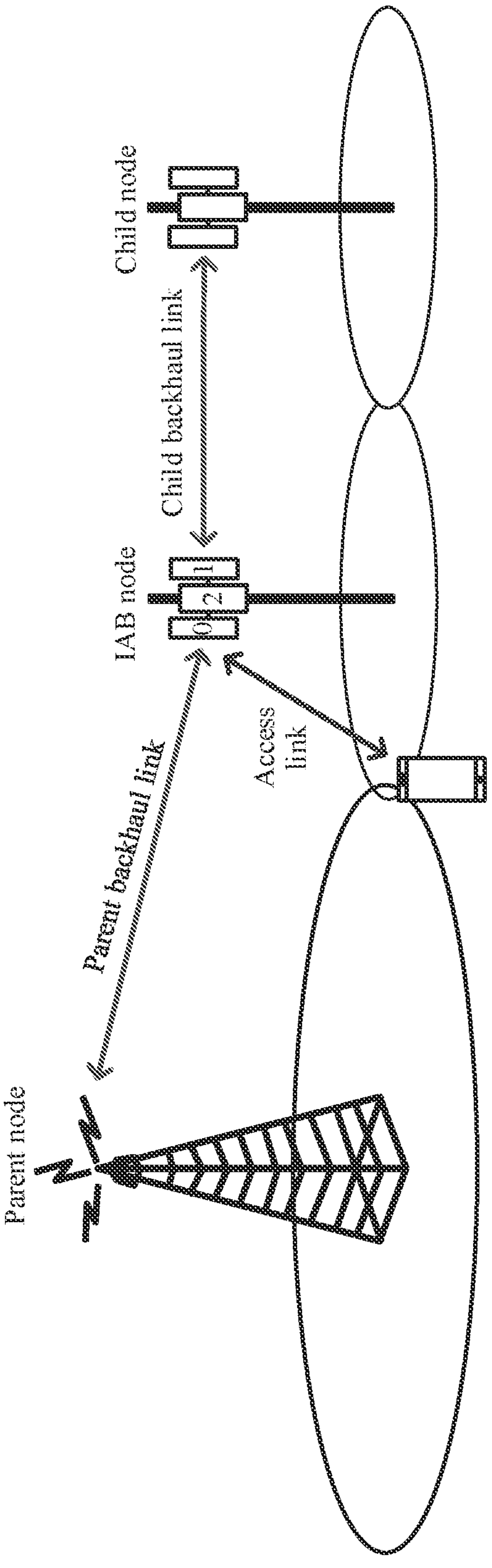
FIG. 1 is a schematic diagram of a structure of a communication system to which an embodiment of this application is applicable.
Figure 4:
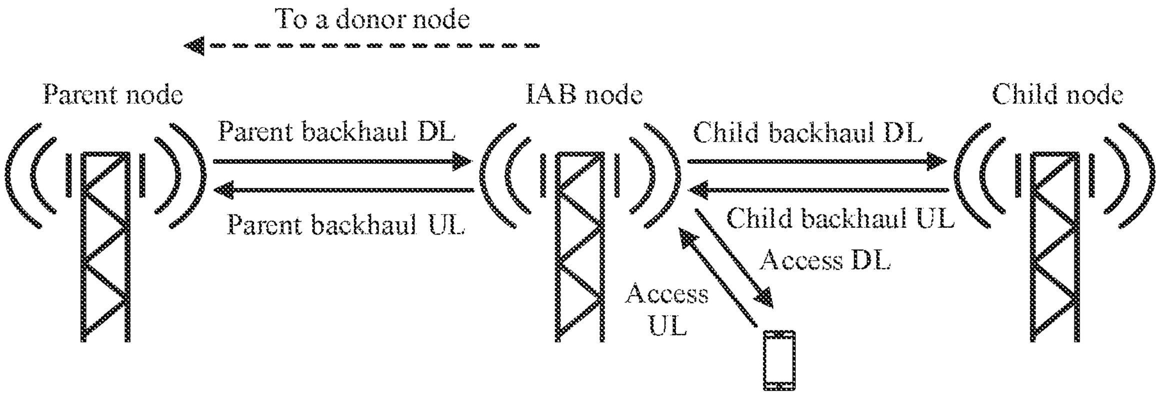
FIG. 4 is a schematic diagram of an access link and a backhaul link according to an embodiment of this application.

As shown in FIG. 1, a link between an MT of an IAB node and a parent node is referred to as a parent backhaul link (parent BackHaul link), a link between a DU of the IAB node and a child TAB node of the IAB node is referred to as a child backhaul link (child BackHaul link), and a link between the DU of the IAB node and subordinate UE is referred to as an access link (access link). The parent backhaul link includes a parent backhaul uplink (uplink, UL) and a parent backhaul downlink (downlink. DL). The child backhaul link includes a child backhaul UL and a child backhaul DL. The access link includes an access UL and an access DL, as shown in FIG. 4. In this application, for ease of description, a link between an IAB node and a parent node is referred to as a backhaul link, and a link between an IAB node and a child IAB node and/or UE is collectively referred to as an access link.

Usually, a child node may be considered as a terminal device of a parent node. It should be understood that in the integrated access and backhaul system shown in FIG. 2, one IAB node is connected to one parent node. However, in a future relay system, to improve reliability of a wireless backhaul link, a plurality of parent nodes may simultaneously provide services for one IAB node, for example, the IAB node 220. For example, the IAB node 230 in FIG. 2 may be further connected to the IAB node 220 through a backhaul link 234, in other words, both the TAB node 210 and the IAB node 220 are parent nodes of the IAB node 230. It should be noted that in this application, names of the IAB node 210, the TAB node 220, and the IAB node 230 do not limit names of the IAB node 210, the IAB node 220, and the TAB node 230 in a deployed scenario or network. For example, the name of the JAB node 210, the IAB node 220, or the JAB node 230 may be a relaying TRP, an RN, or the like. In this application, the IAB node is used only for ease of description.

It should be noted that, in FIG. 2, a radio link 202, a radio link 212, a radio link 222, a radio link 232, the radio link 213, the radio link 223, the radio link 233, and the radio link 234 may be bidirectional links, including uplink and downlink transmission links. In particular, the wireless backhaul link 213, the wireless backhaul link 223, the wireless backhaul link 233, and the wireless backhaul link 234 may be used by a parent node to provide services for a child node. For example, the parent node 200 provides a wireless backhaul service for the child node 210. It should be understood that an uplink and a downlink of the backhaul link may be separated, in other words, transmission on the uplink and transmission on the downlink are not initiated by a same node. Downlink transmission means that the parent node such as the node 200, transmits information or data to the child node such as the IAB node 210. The uplink transmission means that the child node such as the IAB node 210, transmits information or data to the parent node such as the node 200. The node is not limited to a network node or a terminal device. For example, in a device-to-device (Device to Device, D2D) scenario, a terminal device may serve as a relay node to serve another terminal device. The wireless backhaul link may also be the access link in some scenarios. For example, the wireless backhaul link 223 may also be considered as an access link of the IAB node 210, and the wireless backhaul link 213 is also an access link of the node 200. It should be understood that the parent node may be a base station or may be a relay node and that the child node may be a relay node or may be a terminal device that has a relay function. For example, in the D2D scenario, a child node may also be a terminal device.

It may be understood that the IAB node may use an allocated backhaul link resource to communicate with the parent node or the child node through the wireless backhaul link. More specifically, the MT may use a backhaul link resource that a donor node allocates to the MT to communicate with the parent node of the JAB node through the parent backhaul link; and the DU may use a backhaul link resource that the donor node allocates to the DU to communicate with the child node of the IAB node through the child backhaul link.

The following uses an LTE relay system and an NR relay system as examples to describe a conventional backhaul link resource allocation method.

Backhaul link resource allocation in the LTE relay system is used as an example. In the LTE relay system, a donor node allocates a backhaul link resource to a relay node in a unit of a subframe (1 ms), and an allocation periodicity is a radio frame (10 ms). Specifically, the donor node specifies some subframes as backhaul link subframes by using RRC signaling. A quantity of the backhaul link subframes and locations of the backhaul link subframes may be reconfigured.

For the relay node in LTE, when a subframe is configured as a backhaul subframe, the relay node needs to monitor a relay physical downlink control channel (relay physical downlink control channel, R-PDCCH) and/or receive a physical downlink shared channel (physical downlink shared channel, PDSCH) in the subframe. In this case, the subframe cannot be used for sending on an access link. A specific example of downlink backhaul link resource allocation in an LTE relay system shown in FIG. 5 is used as an example. As shown in FIG. 5, a subframe 2, a subframe 4, and a subframe 6 are configured as backhaul links. In this case, the subframe 2, the subframe 4, and the subframe 6 on an access link at corresponding locations are not available. Therefore, an LTE relay performs semi-static time division multiplexing (time division multiplexing, TDM) resource allocation.

Backhaul link resource allocation in the NR relay system is used as an example. MT resources of an IAB node may be configured as three types: downlink (downlink, D), uplink (uplink, U), and flexible (Flexible, F). The three types are also supported by an existing terminal device, and therefore may be indicated by using existing signaling. Different from a terminal device, the MT resources of the IAB node may support more slot formats.

DU resources of the IAB node may be configured as three types: downlink, uplink, and flexible. Further, the DU resources of the three types, namely, downlink, uplink, and flexible, may be further configured with three attributes: hard (hard, H), soft (soft, S), and not available (not available, NA). An NA resource of the DU indicates a resource that is always not available for the DU. A hard resource of the DU indicates a resource that is always available for the DU. A soft resource of the DU indicates a case in which whether the resource is available for the DU depends on an indication of a parent node.

In this application, DU resource attribute configuration may be performed on a per-resource type basis in each slot. For example, in one slot, if the DU resources are configured as a plurality of resource types (D/U/F), different resource types may be configured with different attributes (H/S/NA). As shown in FIG. 6, a downlink resource, an uplink resource, and a flexible resource may all be configured with the three attributes: hard, soft, or not available.

In the NR relay system, MT resource configuration and DU resource configuration are performed independently. Specifically, an available resource and a not available resource of an MT may be explicitly configured by a parent node by using higher layer signaling (for example, RRC signaling). A soft resource and a hard resource of a DU may be explicitly configured by the parent node by using higher layer signaling (for example, RRC signaling) or an interface message (for example, an F1-AP interface message or an enhanced F1-AP interface message.) Alternatively, an available resource and a not available resource of an MT may be implicitly deduced by an TAB node based on a type of a DU resource, and a soft resource and a hard resource of a DU may be implicitly deduced by the TAB node based on the MT resource configuration. A manner in which the available resource and the not available resource of the MT are obtained and a manner in which the soft resource and the hard resource of the DU are obtained are not limited in this application. For example, in an NR R16 protocol, an attribute of the DU resource of the IAB node is explicitly configured by a donor node, and availability of the MT resource is implicitly deduced by the IAB node and/or the parent node of the IAB node based on the attribute of the DU resource.

It can be learned from the foregoing that resource allocation on the DU of the IAB node in NR depends on an indication of the donor node and/or the parent node, and the DU resource is indicated in a manner of semi-static allocation and dynamic indication. This resource allocation manner is greatly different from a resource allocation method in an LTE system.

An example of MT resource and DU resource allocation in an NR relay system shown in FIG. 7 is used. An MT of an IAB node is connected to a DU of a parent node, and a DU of the TAB node is connected to an MT of a child node. After semi-static (for example, by using RRC signaling and/or F1-AP interface signaling) resource configuration, the IAB node may separately obtain resource configuration of an MT resource and a DU resource of the TAB node. As shown in FIG. 7, three consecutive DU slots are respectively configured as NA, hard, and soft. Three consecutive MT slots are all configured as downlink. It should be understood that the foregoing related configuration may be obtained by using explicit signaling, or may be obtained in an implicit manner. The IAB node and the parent node of the IAB node may infer an available resource of the MT of the IAB based on the DU resource configuration.

For example, with reference to FIG. 7 and the following Table 1, it may be learned that for the TAB node, an MT resource corresponding to a DU resource corresponding to a hard resource of the DU of the IAB node in the first slot is not available.

Specifically, possible behavior of the MT of the IAB node and the DU corresponding to the MT are shown in the following two tables. Table 1 shows resource configuration statuses of various possible resource type combinations of the MT and the DU in a time division multiplexing scenario. Table 2 shows resource configuration statuses of various possible resource type combinations of the MT and the DU in a spatial division multiplexing (spatial division multiplexing, SDM) scenario.

TABLE 1

| DU resource | MT resource type | | |
|---|---|---|---|
| type | D | U | F |
| D-H | DU: Tx<br>MT: NA | DU: Tx<br>MT: NA | DU: Tx<br>MT: NA |
| D-S | When the DU resource: IA<br>DU: Tx<br>MT: NA<br>When the DU resource: INA<br>DU: NA<br>MT: Rx | When the DU resource: IA<br>DU: Tx<br>MT: NA<br>When the DU resource: INA<br>DU: NA<br>MT: Tx | When the DU resource: IA<br>DU: Tx<br>MT: NA<br>When the DU resource: INA<br>DU: NA<br>MT: Tx/Rx |
| U-H | DU : Rx<br>MT: NA | DU: Rx<br>MT: NA | DU: Rx<br>MT: NA |
| U-S | When the DU resource: IA<br>DU: Rx<br>MT: NA<br>When the DU resource: INA<br>DU: NA<br>MT: Rx | When the DU resource: IA<br>DU: Rx<br>MT: NA<br>When the DU resource: INA<br>DU: NA<br>MT: Tx | When the DU resource: IA<br>DU: Rx<br>MT: NA<br>When the DU resource: INA<br>DU: NA<br>MT: Tx/Rx |
| F-H | DU: Tx/Rx<br>MT: NA | DU: Tx/Rx<br>MT: NA | DU: Tx/Rx<br>MT: NA |
| F-S | When the DU resource: IA<br>DU: Tx/Rx<br>MT: NA<br>When the DU resource: INA<br>DU: NA<br>MT: Rx | When the DU resource: IA<br>DU: Tx/Rx<br>MT: NA<br>When the DU resource: INA<br>DU: NA<br>MT: Tx | When the DU resource: IA<br>DU: Tx/Rx<br>MT: NA<br>When the DU resource: INA<br>DU: NA<br>MT: Tx/Rx |
| NA | DU: NA<br>MT: Rx | DU: NA<br>MT: Tx | DU: NA<br>MT: Tx/Rx |

TABLE 2

| DU resource | MT resource Type | | |
|---|---|---|---|
| type | DL | UL | F |
| DL-H | DU: Tx<br>MT: NA | DU: Tx<br>MT: Tx | DU: Tx<br>MT: Tx |
| DL-S | When the DU resource: IA<br>DU: Tx<br>MT: NA<br>When the DU | When the DU resource: IA<br>DU: Tx<br>MT: Tx<br>When the DU | When the DU resource: IA<br>DU: Tx<br>MT: Tx<br>When the DU |

TABLE 2-continued

| DU resource | MT resource Type | | |
|---|---|---|---|
| type | DL | UL | F |
| | resource: INA<br>DU: NA<br>MT: Rx | resource: INA<br>DU: NA<br>MT: Tx | resource: INA<br>DU: NA<br>MT: Tx/Rx |
| UL-H | DU: Rx<br>MT: Rx | DU: Rx<br>MT: NA | DU: Rx<br>MT: Rx |
| UL-S | When the DU<br>resource: IA<br>DU: Rx<br>MT: Rx<br>When the DU<br>resource: INA<br>DU: NA<br>MT: Rx | When the DU<br>resource: IA<br>DU: Rx<br>MT: NA<br>When the DU<br>resource: INA<br>DU: NA<br>MT: Tx | When the DU<br>resource: IA<br>DU: Rx (only when the<br>IAB-DU learns<br>in advance that the<br>IAB-MT is in an Rx state)<br>MT: Rx<br>When the DU<br>resource: INA<br>DU: NA<br>MT: Tx/Rx |
| F-H | DU: Tx/Rx<br>MT: Rx (only when the<br>parent node learns<br>in advance that the<br>IAB-DU is in an Rx state) | DU: Tx/Rx<br>MT: Tx (only when the<br>parent node learns<br>in advance that the<br>IAB-DU is in a Tx state) | DU: Tx/Rx<br>MT: Tx (only when the<br>parent node-DU learns<br>in advance that the<br>IAB-DU is in a Tx state),<br>or Rx (only when the<br>parent node-DU learns<br>in advance that the<br>IAB-DU is in an Rx state) |
| F-S | When the DU<br>resource: IA<br>DU: Tx/Rx<br>MT: Rx (only when the<br>parent node learns<br>in advance that the<br>IAB-DU is in an Rx state)<br>When the DU<br>resource: INA<br>DU: NA<br>MT: Rx | When the DU<br>resource: IA<br>DU: Tx/Rx<br>MT: Tx (only when the<br>parent node learns<br>in advance that the<br>IAB-DU is in a Tx state)<br>When the DU<br>resource: INA<br>DU: NA<br>MT: Tx | When the DU<br>resource: IA<br>DU: Tx/Rx<br>MT: Tx (only when the<br>parent node-DU learns<br>in advance that the<br>IAB-DU is in a Tx state),<br>or Rx (only when the<br>parent node-DU learns<br>in advance that the<br>LAB-DU is in an Rx state)<br>When the DU<br>resource: INA<br>DU: NA<br>MT: Tx/Rx |
| NA | DU: NA<br>MT: Rx | DU: NA<br>MT: Tx | DU: NA<br>MT: Tx/Rx |

In the foregoing Table 1 and Table 2, meanings of identifiers are as follows. "MT: Tx" indicates that the MT performs transmission after being scheduled. "DU: Tx" indicates that the DU may perform transmission. "MT: Rx" indicates that the MT is capable of performing receiving (if there is a signal that needs to be received) "DU: Rx" indicates that the DU may schedule uplink transmission of the child node. "MT: Tx/Rx" indicates that the MT performs transmission or receiving after being scheduled, but the MT does not simultaneously perform the transmission and receiving. "DU: Tx/Rx" indicates that the DU may perform transmission or receiving transmission of the child node, but the DU does not simultaneously perform the transmission and receiving. "IA" indicates that the DU resource is explicitly or implicitly indicated as available. "INA" indicates that the DU resource is explicitly or implicitly indicated as not available. "MT: NA" indicates that the MT does not perform sending and does not need to have a receiving capability. "DU: NA" indicates that the DU does not perform sending and does not receive the transmission of the child node.

The NR JAB uses a two-level resource indication to dynamically coordinate resources between an access link and a backhaul link. Specifically, the two-level resource indication means that the parent node configures a soft resource and a hard resource for the DU of the IAB node in an explicit or implicit manner. Availability of the soft resource depends on a dynamic signaling indication of the parent node.

In some embodiments, the parent node may indicate the availability of the soft resource of the DU of the IAB by using DCI (for example, in a DCI format 2_5). The dynamic indication of the soft resource may also be performed on a per-resource type basis in a slot, as shown in Table 3. For example, when a value is 3, it indicates that all uplink soft symbols and downlink soft symbols in the slot are configured as available.

Optionally, the parent node may configure, for the IAB node in one piece of signaling, availability of soft resources that are in a plurality of slots.

TABLE 3

| Value | Indication content |
|---|---|
| 0 | No soft symbol is indicated as available. |
| 1 | Only a downlink soft symbol is available. |
| 2 | Only an uplink soft symbol is available. |
| 3 | Both an uplink soft symbol and a downlink soft symbol are available. |
| 4 | Only a flexible symbol is available. |
| 5 | Only a downlink symbol and a flexible symbol are available. |
| 6 | Only an uplink symbol and a flexible symbol are available. |

TABLE 3-continued

| Value | Indication content |
|---|---|
| 7 | A downlink symbol, an uplink symbol and a flexible symbol are all available. |

It should be noted that in embodiments of this application, only a slot is used as an example to describe resource allocation, but embodiments of this application are not limited. In practice, the slot may be replaced with another time domain resource, for example, a frame, a subframe, a mini-slot, or a symbol.

Embodiments of this application provide a resource configuration method. A parent node may configure an MT resource and/or a DU resource for a relay node based on an actual capability (for example, a resource multiplexing capability actually supported by an MT carrier and a DU cell of the relay node) of the relay node (for example, an IAB node) and a parameter requirement, so that an MT and a DU of the relay node may communicate with the parent node or a child node in a resource multiplexing manner that meets the capability of the MT and DU of the relay node.

In embodiments of this application, the resource multiplexing manner may include but is not limited to TDM, SDM, frequency division multiplexing (frequency division multiplexing, FDM), and full duplex (full duplex, FD). When the resource multiplexing capability actually supported by the MT carrier and the DU cell of the relay node is different, there may be different correspondences between resource configuration of the MT resource and resource configuration of the DU resource. For example, if the MT and the DU support TDM, the MT and the DU of the IAB node cannot perform transmission simultaneously; if the MT and the DU support SDM or FDM, the DU may receive a signal while the MT sends a signal, or the DU may send a signal while the MT receives a signal; or if the MT and the DU support FD, the MT and the DU may perform transmission simultaneously, which is not limited to perform receiving or sending simultaneously.

TDM means that the MT and the DU perform signal receiving or sending on different time domain resources. That TDM is applied to the MT and the DU of the relay node in embodiments of this application may be specifically as follows: For a hard resource of the DU, an MT resource in a corresponding slot is a not available resource, in other words, the MT does not communicate with the parent node in the slot; or for a not available resource of the MT, a DU resource in a corresponding slot is a hard resource. In this way, transmission by the MT and transmission by the DU do not overlap with each other on a time axis.

SDM means that the MT and the DU may simultaneously perform sending or receiving. That SDM is applied to the MT and the DU of the relay node in embodiments of this application may be specifically as follows: When the DU performs downlink sending, the MT may perform uplink sending on a corresponding resource; or when the DU performs uplink receiving, the MT may perform downlink receiving on a corresponding resource.

FD means that the MT and the DU of the IAB node may perform transmission in a same direction. That FD is applied to the MT and the DU of the relay node in embodiments of this application may be specifically as follows: When the DU performs downlink sending, the MT may perform downlink receiving on a corresponding resource; or when the DU performs uplink receiving, the MT may perform uplink sending on a corresponding resource.

Both SDM and FD are non-time division multiplexing. Further, non-time division multiplexing may be classified into dynamic non-time division multiplexing and semi-static (or fixed) non-time division multiplexing. A difference between dynamic non-time division multiplexing and semi-static (or fixed)non-time division multiplexing lies in that dynamic non-time division multiplexing is applicable only to a soft resource of the DU; but semi-static (or fixed) non-time division multiplexing is also applicable to the hard resource of the DU. For example, both the MT and the DU perform sending simultaneously in a manner of SDM. It is assumed that a slot of the DU cell is configured as a downlink resource, and an MT carrier corresponding to the slot is configured as an uplink resource. For dynamic non-time division multiplexing, a first node may consider that when the DU resource in the slot is the hard resource, a second node does not schedule the uplink resource of the MT in the slot; when the DU resource in the slot is the soft resource, the first node may determine appropriate downlink scheduling of the DU based on uplink scheduling of the MT, so that the MT and the DU perform sending simultaneously. For semi-static (or fixed) non-time division multiplexing, the first node considers that the second node may schedule the MT in the slot, in other words, a resource attribute of the DU does not affect availability of the MT resource. In this case, even if the DU resource in the slot is the hard resource, the second node may schedule the uplink resource of the MT in the slot.

The following specifically describes the resource configuration method provided in embodiments of this application with reference to the drawings.

Figure 8:
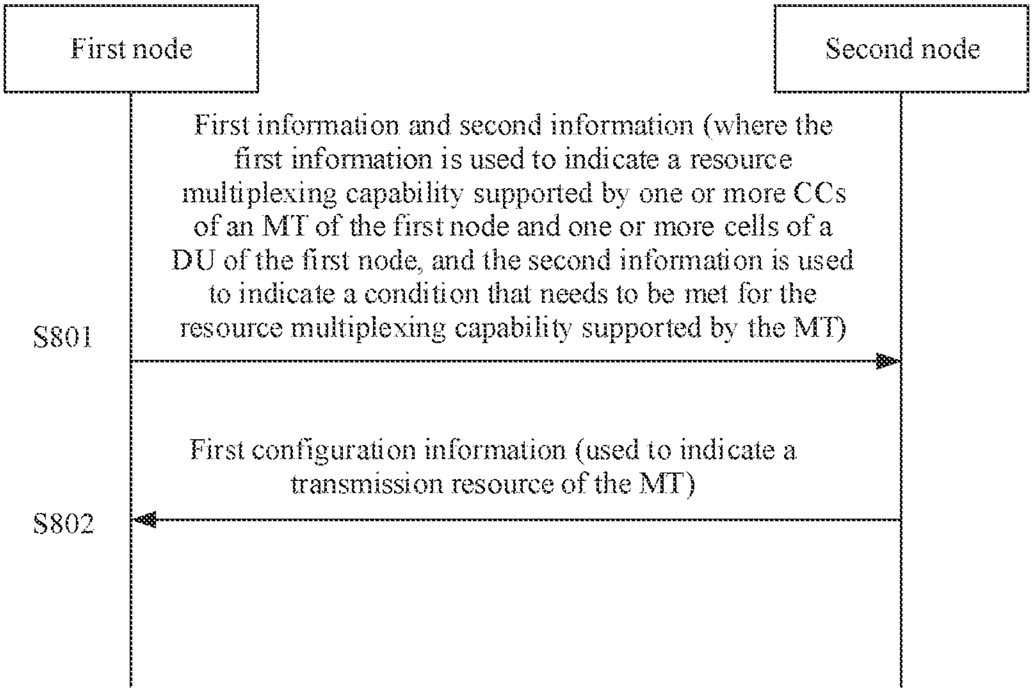
FIG. 8 is an interaction diagram of a resource configuration method according to an embodiment of this application.

As shown in FIG. 8, the resource configuration method provided in embodiments of this application may include the following steps: S801 and S802.

S801: A first node sends first information and second information to a second node. The first information is used to indicate a resource multiplexing capability supported by one or more carriers (CCs) of an MT of the first node and one or more cells (cells) of a DU of the first node. The second information is used to indicate a condition that needs to be met for the resource multiplexing capability supported by the one or more carriers of the MT.

Correspondingly, the second node receives the first information and the second information sent by the first node.

In embodiments of this application, the first node may be a relay node. For example, the first node may be an IAB node shown in FIG. 1. The first node may have a structure shown in FIG. 3. In other words, the first node may be divided into two parts: an MT and a DU. The second node is a parent node, a donor node, or a parent node (parent node) of the first node.

Figure 9:
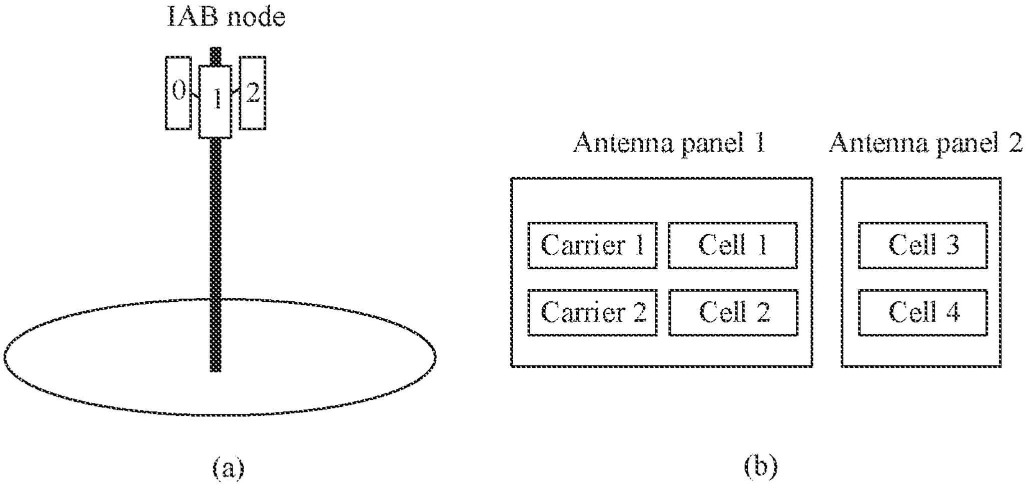
FIG. 9 is a schematic diagram of structures of an MT and a DU according to an embodiment of this application.

The MT and the DU of the first node may have (or include, exist, correspond to, or cover) a plurality of subunits. For example, the DU of the first node may have panels or sectors 1, 2, and 3 facing a plurality of directions, and different panels, for example, panels/sectors 1, 2, and 3 shown in FIG. 1, correspond to different cells (cells). For another example, as shown in (a) in FIG. 9, the DU of the IAB node includes two panels/sectors 1 and 2 facing different directions. Alternatively, the MT of the first node may apply a carrier aggregation technology, where different carriers (CCs) correspond to different cells (cells). Alternatively, the MT of the first node may include different bandwidth parts (Bandwidth parts, BWPs) and the like. Alternatively, the MT of the first node may be connected to different parent nodes, where the connection may be performed by using different carrier groups. As shown in (b) in FIG. 9, the antenna panel 1 includes an MT carrier 1, an MT carrier 2, a DU cell 1, and a DU cell 2, and the antenna panel 2 includes a DU cell 3 and a DU cell 4. It should be understood that, in a protocol, the carrier of the MT may be referred to as a serving cell (serving cell).

In embodiments of this application, the resource multiplexing capability supported by the one or more carriers of the MT of the first node and the one or more cells of the DU of the first node may be understood as resource multiplexing performed by the MT and the DU of the first node when the MT and the DU transmit signals on a corresponding resource such as each antenna panel/each carrier/each cell.

In some embodiments, the resource multiplexing capability supported by the MT of the first node and the DU of the first node may be further understood as resource multiplexing performed by a combination of the MT and the DU of the first node when the combination of the MT and the DU transmits signals on a corresponding resource such as each antenna panel/each carrier/each cell.

The resource multiplexing capability supported by the one or more MT carriers/serving cells of the first node and the one or more cells of the DU of the first node may include at least the following capability 1, capability 2, capability 3, capability 4, and capability 5.

- Capability 1 is No TDM for MT-TX/DU-TX. The capability 1 indicates that the MT and the DU can simultaneously send signals. The capability 1 may also be referred to as SDM sending.
- Capability 2 is No TDM for MT-TX/DU-RX. The capability 2 indicates that the DU can simultaneously receive a signal while the MT sends a signal. The capability 2 may also be referred to as uplink full duplex.
- Capability 3 is No TDM for MT-RX/DU-TX. The capability 3 indicates that the DU can simultaneously send a signal while the MT receives a signal. The capability 3 may also be referred to as downlink full duplex.
- Capability 4 is No TDM for MT-RX/DU-RX. The capability 4 indicates that the MT and the DU can simultaneously receive signals. The capability 4 may also be referred to as SDM receiving.
- Capability 5 is TDM. The capability 5 indicates that the MT and the DU cannot simultaneously perform transmission.

It should be noted that for different resource multiplexing capabilities supported by the MT carriers and the DU cells of the first node, different conditions need to be met. When the MT carriers or the DU cells of the first node support a resource multiplexing capability, further, the first node can use, completely according to a corresponding multiplexing rule, an MT resource and/or a DU resource allocated to the first node only when the resource configured for the first node meets a corresponding condition. An example in which the MT and the DU simultaneously send or receive signals is used for description. When a carrier of the MT and a cell of the DU have a non-time division multiplexing capability of No TDM MT-RX/DU-RX or No TDM MT-TX/DU-TX, it does not necessarily indicate that a combination of the MT carrier and the DU cell may perform SDM receiving or sending at any time. When the MT carrier is occupied by a backhaul link for transmission, the DU cell may perform access link transmission only under a specific condition.

It should be understood that any MT carrier, any DU cell, or any combination of the MT carrier and the DU cell of the first node may have a plurality of resource multiplexing capabilities, to be specific, in the first information sent by the first node to the second node, a same DU cell, a same MT carrier, or a same combination of an MT carrier and a DU cell may support a plurality of resource multiplexing capabilities.

In some embodiments, the second information may include one or more of the following MT transmission parameter conditions: condition (a) to condition (f).

Condition (a) is a downlink receive power of the MT set in a specific interval.

For example, if the MT needs to receive a signal by using an SDM technology, the downlink signal power of the MT needs to be in a specific range, to avoid a problem that performance is affected by an excessively large spatial division receive power difference. In this case, the MT of the first node has an expected downlink receive power range. When the power received by the MT of the first node is within the expected range, the first node may simultaneously perform signal receiving of the MT and the DU by using the SDM technology. However, when the receive power of the MT exceeds the expected range, a signal power difference between the MT and the DU may be large. Consequently, the first node cannot successfully receive one or more of signals.

In embodiments of this application, when the first node reports the expected downlink receive power range of the first node, one method is that the first node reports a difference between an expected downlink receive power of the first node and a reference signal power. A reference signal may include but is not limited to a synchronization signal (synchronization signal, SS)/a physical broadcast channel (physical broadcast channel, PBCH) block (block) (or referred to as a synchronization signal block SSB), a channel state information reference signal (channel state information reference signal, CSI-RS), and the like. After the second node receives information about the power difference, the second node may implement, by using a method such as adjusting a downlink transmit power, the downlink receive power required by the MT, so that the first node may simultaneously perform signal receiving of the MT and the DU by using the SDM technology. In the protocol, the receive power may be represented by energy per resource element (energy per resource element, EPRE) of a channel such as a PDSCH or a reference signal such as a demodulation reference signal (demodulation reference signal, DMRS).

Condition (b) is a maximum quantity of DMRS ports for downlink scheduling of the MT.

For example, if the MT needs to receive a signal by using an SDM technology, a PDSCH received by the MT may be able to occupy only some DMRS ports, to implement DMRS orthogonalization of signals received by the MT and the DU. Therefore, if the MT is expected to receive the signal by using the SDM technology, the first node may report, to the second node, a maximum quantity of downlink DMRS ports that the MT expects to be scheduled or configured, or a quantity of downlink DMRS ports that the DU needs to reserve. Optionally, the first node may report a maximum quantity of downlink DMRS code groups (CDM groups) that the MT expects to be scheduled or configured, or a quantity of downlink DMRS code groups (CDM groups) that the DU needs to reserve.

Condition (c) is a maximum quantity of DMRS ports for uplink scheduling of the MT.

For example, if the MT needs to send a signal by using an SDM technology, a physical uplink shared channel (physical uplink shared channel, PUSCH) sent by the MT may occupy only some DMRS ports, to implement DMRS orthogonalization of signals sent by the MT and the DU. Therefore, if the MT is expected to send the signal by using the SDM technology, the first node may report, to the second node, a maximum quantity of uplink DMRS ports that the MT expects to be scheduled or configured, or a quantity of uplink DMRS ports that the DU needs to reserve. Optionally, the first node may report, to the second node, a maximum quantity of uplink DMRS code groups (CDM groups) that the MT expects to be scheduled or configured, or a quantity of uplink DMRS code groups (CDM groups) that the DU needs to reserve.

Condition (d) is a timing mode for uplink scheduling of the MT set to a specific mode.

For example, the MT needs to apply a specific uplink timing mode to support SDM or FD. Usually, the MT may support a plurality of timing modes, including conventional uplink timing based on a timing advance (timing advance, TA), an MT uplink timing mode aligned with DU downlink timing, uplink timing based on a TA and an additional offset, and the like. To perform SDM or FD, the MT of the first node may need to apply specific timing. Therefore, the first node may report the required timing mode to the second node, so that the second node configures the timing mode for the MT of the first node.

Condition (e) is an uplink transmit beam ID supported by the MT.

For example, if the MT needs to send a signal by using an SDM technology, an uplink beam used when the MT performs sending needs to be selected within a specific range, to avoid excessively strong interference. Therefore, the first node may report, to the second node, an ID of an uplink transmit beam on which non-time division transmission can be performed. The beam ID may be represented by using the following parameters, for example, a sounding reference signal resource indicator (sounding reference signal resource indicator, SRI) or an identifier of spatial relationship information (spatialRelationInfo). The SRI is used to indicate a resource number of an SRS, and indicates that the MT needs to use a same beam (or a same spatial filter) as the SRS to perform uplink sending. The spatial relationship information includes one or more uplink or downlink reference signal identifiers. After the spatial relationship information is configured for uplink signal sending of the MT or UE, the MT or the UE determines an uplink transmit beam (or a spatial filter) by using the configuration. For example, when the spatial relationship information includes a downlink reference signal, the UE or the MT performs uplink sending by using a spatial filter used to receive the downlink reference signal; or when the spatial relationship information includes an uplink reference signal, the UE or the MT performs uplink sending by using a spatial filter used to send the uplink reference signal.

Condition (f) is a downlink receive beam identifier or a transmission configuration indicator state (transmission configuration indicator state, TCI-state) identifier supported by the MT.

For example, if the MT needs to receive a signal by using an SDM technology, a downlink beam received by the MT needs to be selected within a specific range, to avoid excessively strong interference. Therefore, the first node may report, to the second node, an ID or TCI-state identification information of a downlink receive beam on which non-time division transmission can be performed. The receive beam ID or the TCI-state information may include a quasi co-location (quasi co-location, QCL) identifier, and the quasi co-location identifier is generally a reference signal identifier. Signals corresponding to antenna ports having a QCL relationship may have a same or similar channel large-scale property parameter (or referred to as a parameter). Alternatively, a channel large-scale property parameter (or referred to as a parameter) of an antenna port may be used to determine a channel large-scale property parameter (or referred to as a parameter) of another antenna port that has a QCL relationship with the antenna port. Alternatively, two antenna ports have a same or similar channel large-scale property parameter (which is also referred to as a parameter). Alternatively, a difference between channel large-scale property parameters (or referred to as parameters) of two antenna ports is less than a threshold. The channel large-scale property parameter includes one or more of the following parameters: delay spread, Doppler spread, a Doppler shift, an average gain, an average delay, or a spatial receive parameter.

In some embodiments, the second information may further include the following MT transmission parameter condition (g).

Condition (g) is additional channel state information (channel state information, CSI) reporting or additional sounding reference signal (sounding reference signal, SRS) measurement.

Usually, in a slot in which the MT performs SDM receiving or downlink FD, the MT needs to report additional CSI, which is used for the second node to obtain downlink transmission channel state information. For example, the CSI includes a channel quality indicator, a codebook indication, or rank indication information of downlink transmission. Alternatively, in a slot in which the MT performs SDM sending or uplink FD, the MT needs to send a dedicated SRS that is used for the second node to perform channel estimation. For example, the SRS includes uplink channel frequency domain information and/or interference information.

That is, a resource multiplexing capability of the MT and the DU of the first node can be used only when the MT transmission parameter condition meets a specific value or value range.

In some other embodiments, the second information may further be used to indicate a condition that needs to be met for the resource multiplexing capability supported by the DU. The second information may further include one or more of the following DU transmission parameter conditions: condition (A) to condition (E).

Condition (A) is an uplink receive power of the DU set in a specific interval.

Condition (B) is a downlink transmit power of the DU set in a specific interval.

Condition (C) is a timing mode for uplink receiving of the DU set to a specific mode.

Condition (D) is a downlink transmit beam ID supported by the DU.

Condition (E) is an uplink receive beam ID supported by the DU.

That is, a resource multiplexing capability of the MT and the DU of the first node can be used only when the DU transmission parameter condition meets a specific value or value range. For descriptions of the condition (A) the condition (B), the condition (C), the condition (D), and the condition (E), respectively refer to the descriptions of the condition (a), the condition (d), the condition (e), and the condition (f). Details are not described herein again.

It should be noted that when the MT transmission parameter condition reported by the first node to the second node includes a plurality of the foregoing condition (a) to condition (f), the MT transmission parameter condition may include a combination of the plurality of conditions. For example, the MT transmission parameter condition may include (condition (a), condition (b)), indicating that the first node can implement a resource multiplexing capability when both the condition (a) and the condition (b) are met. Alternatively, the MT transmission parameter condition may include a plurality of groups of conditions. For example, the MT transmission parameter condition may include [{condition (a), condition (b)}, condition (c)], indicating that the first node can implement a resource multiplexing capability when both the condition (a) and the condition (b) are met or when the condition (c) is met. When the first node reports a plurality of DU transmission parameter conditions to the second node, a same manner in which a combination of the conditions is reported may also be applied.

In some embodiments, the first node may send the first information to the second node by using first signaling, and send the second information to the second node by using second signaling. For example, the first signaling may include the following information:

```
  {
  MT servingCellId: #n
  DU cell id: #m
  MultiplexingCapablity: one or more of capabilities 1 to 5 (for example, No TDM
for MT-TX/DU-TX)
  }.
```

The second signaling may include the following information:

```
  {
  MT servingCellId: #n
  DU cell id: #m
  MultiplexingCapablity: one or more of capabilities 1 to 5 (for example, No TDM
for MT-TX/DU-TX)
  Condition combination 1:
  {
  One or more of the foregoing conditions (a) to (g)
  }
  Condition combination 2:
  {
  One or more of the foregoing conditions (a) to (g)
  }
  ....
  }.
```

In some other embodiments, the first node may simultaneously send the first information and the second information to the second node by using first signaling. For example, the first signaling may include the following information:

```
  {
  MT servingCellId: #n
  DU cell id: #m
  MultiplexingCapablity: one or more of capabilities 1 to 5 (for example, No TDM
for MT-TX/DU-TX)
  Condition combination 1:
  {
  One or more of the foregoing conditions (a) to (g)
  }
  Condition combination 2:
  {
  One or more of the foregoing conditions (a) to (g)
  }
  ....
  }.
```

In some embodiments, the first node may send the first signaling to the donor node through an F1-AP interface, and the donor node forwards the first signaling to the parent node, namely, the second node, of the first node. The second signaling may be directly reported by the first node to the second node, for example, by using interface signaling such as F1-AR or by using air interface signaling such as RRC or MAC CE.

S802: The second node sends first configuration information to the first node. The first configuration information is used to indicate a transmission resource of the MT.

Correspondingly, the first node receives the first configuration information from the second node.

The transmission resource of the MT enables the first node to support one of the capability 1, the capability 2, the capability 3, or the capability 4, and the transmission resource of the MT enables the first node to meet the condition required for the capability 1, the capability 2, the capability 3, or the capability 4.

In some embodiments, when the second information indicates the condition that needs to be met for the resource multiplexing capability supported by the DU, the first configuration information may further be used to indicate a transmission resource of the DU. The transmission resource of the DU enables the first node to support one of the capability 1, the capability 2, the capability 3, or the capability 4, and the transmission resource of the DU enables the first node to meet the condition required for the capability 1, the capability 2, the capability 3, or the capability 4.

In embodiments of this application, the second node may send the first configuration information to the first node by using semi-static signaling (for example, the RRC signaling or the MAC CE) or an interface message (for example, an F1-AP message or an enhanced F1-AP interface message). The first node may learn of the transmission resource of the MT of the first node based on the first configuration information.

In some embodiments, the first node may further send third information to the second node. The third information is used to indicate whether the resource multiplexing capability that is supported by at least one of the one or more carriers of the MT of the first node and the one or more cells of the DU of the first node is a restricted resource multiplexing capability.

In some embodiments, when the first node sends the first information and the second information to the second node by using the first signaling, the third information may be carried in the first signaling and sent to the second node together with the first information and the second information.

In some embodiments, when the first node sends the first information to the second node by using the first signaling, and sends the second information to the second node by using the second signaling, the third information may be carried in the first signaling together with the first information and sent to the second node, or may be carried in the second signaling together with the second information and sent to the second node.

For example, the first node sends the first information to the second node by using the first signaling, and sends the second information to the second node by using the second signaling, and the third information is carried in the first signaling. The first signaling may include the following information:

```
{
MT servingCellId: #n
DU cell id: #m
MultiplexingCapablity: No TDM for MT-TX/DU-TX
RestricedCapability: {Yes/No}
}.
```

A value of RestrictedCapability may be Yes or No. If the value of RestrictedCapability is Yes, it indicates that the resource multiplexing capability "No TDM for MT-TX/DU-TX" is the restricted resource multiplexing capability, in other words, the resource multiplexing capability can be used only when a transmission parameter meets a corresponding condition. In this case, the second node may consider the corresponding condition, and configure a resource multiplexing manner and a transmission resource that matches the resource multiplexing manner for the first node. If the value of RestrictedCapability is No, it indicates that the resource multiplexing capability "No TDM for MT-TX/DU-TX" is not the restricted resource multiplexing capability, in other words, there is no special requirement on a transmission parameter. In this case, the second node may directly configure a resource multiplexing manner and a transmission resource that matches the resource multiplexing manner for the first node.

The following shows an example in which the second node configures the resource multiplexing manner and the transmission resource for the first node based on the first information and the second information.

When the first information indicates that an MT (for example, an MT 1) of the first node supports FD (herein, if the MT 1 supports full duplex multiplexing, it may be considered by default that the MT 1 may also support all other resource multiplexing types), the second node may configure one or more of TDM, dynamic SDM/FDM, semi-static SDM/FDM, or FD for the MT 1, and configure a transmission resource that matches the resource multiplexing manner for the MT 1.

When the first information indicates that the MT 1 supports semi-static SDM/FDM, the second node may configure one or more of TDM, dynamic SDM/FDM, or semi-static SDM/FDM for the MT 1, and configure a transmission resource that matches the resource multiplexing manner for the MT 1.

When the first information indicates that the MT 1 supports dynamic SDM/FDM, the second node may configure one or more of TDM or dynamic SDM/FDM for the MT 1, and configure a transmission resource that matches the resource multiplexing manner for the MT 1.

When the first information indicates that the MT 1 supports TDM, the second node may configure TDM for the MT 1, and configure a transmission resource that matches the resource multiplexing manner for the MT 1.

Further, as described above, the non-time division multiplexing capabilities, such as SDM/FDM/FD, may be classified into a dynamic non-time division multiplexing capability and a semi-static (or fixed) non-time division multiplexing capability. Therefore, in some embodiments, when the first node sends the resource multiplexing capability supported by MT and the DU of the first node to the second node, the first node may further report, to the second node, whether the resource multiplexing capability is specifically a dynamic multiplexing capability or a semi-static (fixed) multiplexing capability.

In a possible implementation, the third information may also be used to indicate whether the resource multiplexing capability is specifically the dynamic multiplexing capability or the semi-static (fixed) multiplexing capability. Specifically, if the third information indicates that a resource multiplexing capability is the restricted resource multiplexing capability, it may be considered that the resource multiplexing capability is the dynamic multiplexing capability.

Generally, the first node may meet a transmission parameter requirement of the DU through parameter adjustment. For example, when the MT resource is scheduled, the DU may adjust parameters such as the uplink receive power, the downlink transmit power, the timing mode for uplink receiving, a downlink transmit beam, or an uplink receive beam. To enable the DU to perform the foregoing adjustment, the first node needs to learn in advance whether the MT resource is occupied. Therefore, the requirement on the DU transmission parameter condition may be further converted into a requirement on MT resource configuration. On this basis, in some embodiments, the second information may include the following DU transmission parameter condition (h).

Condition (h) is an MT transmission resource (advance) indication.

Specifically, the MT transmission resource (advance) indication is used to indicate, in advance, a time-frequency resource occupied by MT transmission. In a possible implementation, the first node may infer a resource occupation status of the MT based on DCI from the second node to the DU of the first node.

In the protocol, the MT transmission resource (advance) indication may be implemented by using a dynamic indication of the DU resource. Therefore, the condition (h) may also be a dynamic resource indication of the DU.

Figure 10:
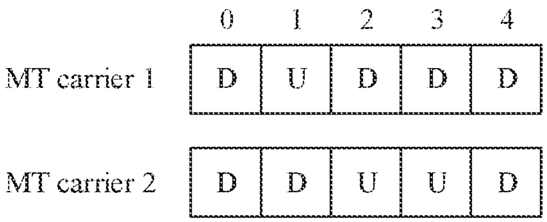
FIG. 10 is an example diagram of resource indication of an MT carrier according to an embodiment of this application.

In embodiments of this application, for the dynamic non-time division multiplexing capability (for example, dynamic SDM/FDM/FD), the second node may indicate availability of the MT resource and/or the DU resource of the first node by using dynamic signaling (for example, DCI). For example, as shown in FIG. 10, the second node may indicate availability of the MT resource on a per-MT carrier basis by using DCI. The second node may indicate availability of a DU soft resource in the indication manners shown in Table 3 above.

Figure 11:
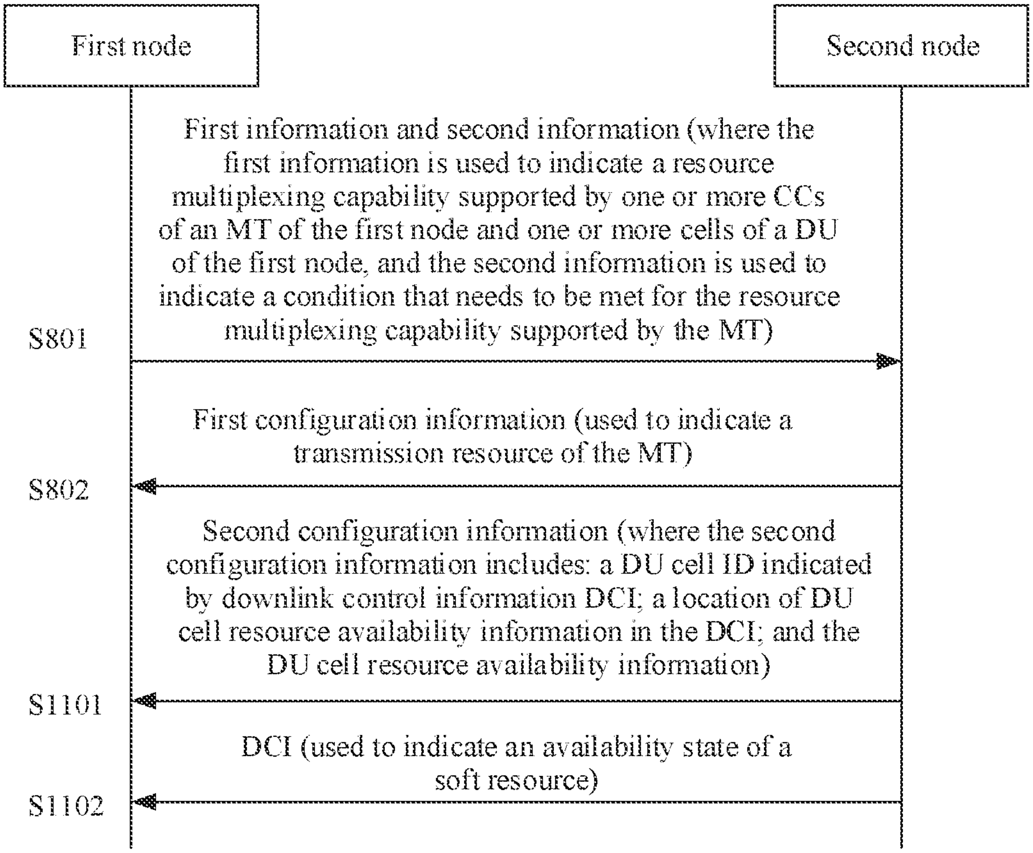
FIG. 11 is another interaction diagram of a resource configuration method according to an embodiment of this application.

Alternatively, the second node may indicate availability of a DU soft resource on a per-DU cell basis by using the dynamic signaling (for example, DCI), so that the first node infers availability of resources of the one or more MT carriers based on the dynamic signaling (for example, the DCI). On this basis, as shown in FIG. 11, in some embodiments, the resource configuration method provided in this embodiment of this application may include the following steps: S1101 and S1102.

S1101: The first node receives second configuration information from the second node. The second configuration information includes: a DU cell ID indicated by the downlink control information DCI; a location of DU cell resource availability information in the DCI; and the DU cell resource availability information.

For example, the second configuration information may include:

```
Availability Indication DCI configuration:
{
iabDuCellId-AI; /indicating a DU cell ID indicated by the field/
positionInDCI-AI; /indicating a location of the field in the DCI/
availabilityCombinations; /indicating resource availability information configured
for a cell, including a plurality of values, where each value may be a combination of a plurality
of values in Table 3 or Table 4/
...
}.
```

S1102: The first node receives the DCI from the second node. The DCI is used to indicate an availability state of a soft resource. Availability states of the soft resource include an availability state 1 and an availability state 2.

In this embodiment, different from Table 3, the DCI may specifically indicate that the soft resource is in either of two different available states, the available state 1 and the available state 2.

The availability state 1 indicates that impact on the MT carrier (for example, a first carrier) does not need to be considered when availability of the soft resource is determined for the DU cell indicated by the DU cell ID. That is, for the available state 1, the second node does not use the first carrier of the MT to perform backhaul link scheduling. The availability state 2 indicates that sending or receiving behavior or a sending or receiving capability of the MT carrier (for example, the first carrier) cannot be affected when the availability of the soft resource is determined for the DU cell indicated by the DU cell ID. That is, for the available state 2, the second node may use the first carrier of the MT to perform backhaul link scheduling. The first carrier of the MT is an MT carrier indicated by the second configuration information, or the first carrier is a corresponding MT carrier that the first node may refer based on the DU cell ID configured in the second configuration information.

For example, the DCI may include indication information shown in the following Table 4.

In embodiments of this application, the first node may infer an ID of a corresponding MT carrier based on the DU cell ID configured in the second configuration information. For example, the MT carrier may be an MT cell that has only a TDM multiplexing capability with the DU cell. Alternatively, the first node may infer an ID of a corresponding MT carrier in another manner, for example, based on a mapping relationship locally preset in the first node. Alternatively, the MT carrier is a carrier that has a same ID as the DU cell.

TABLE 4

| Value | Indication content |
|---|---|
| 0 | Indicating that no soft symbol is in the availability state 1 |
| 1 | Indicating that only a downlink soft symbol is in the availability state 1 |
| 2 | Indicating that only an uplink soft symbol is in the availability state 1 |
| 3 | Indicating that both uplink and downlink soft symbols are in the availability state 1 |
| 4 | Indicating that only a flexible symbol is in the availability state 1 |
| 5 | Indicating that only a downlink symbol and a flexible symbol are in the availability state 1 |
| 6 | Indicating that only an uplink symbol and a flexible symbol are in the availability state 1 |
| 7 | Indicating that a downlink symbol, an uplink symbol and a flexible symbol are all in the availability state 1 |

Alternatively, to further indicate an MT carrier corresponding to the DU cell, in some embodiments, the second configuration information may further include an MT carrier ID indicated by the DCI.

For example, the second configuration information may include:

```
Availability Indication DCI configuration:
{
iabDuCellId-AI; /indicating a DU cell ID indicated by the field/
ServingCellId; /indicating an MT carrier ID (or a serving cell ID of the MT)/
positionInDCI-AI; /indicating a location of the field in the DCI/
availabilityCombinations; /indicating resource availability information configured
for the cell/
...
}.
```

In this embodiment of this application, the availability state 2 may be a default state. In other words, if the DCI does not indicate the availability state 1, the DCI indicates the availability state 2.

Further, in some embodiments, the second node may further send indication information to the first node, where the indication information is used to indicate the first node to interpret the DCI according to a rule in Table 3 or interpret the DCI according to a rule in Table 4. For example, if the indication information is “0”, it indicates that the DCI needs to be interpreted according to the rule in Table 3; or if the indication information is “1”, it indicates that the DCI needs to be interpreted according to the rule in Table 4.

It should be noted that, in FIG. 11, an example in which the second configuration information includes the DU cell ID indicated by the downlink control information DCI is used. Actually, the second configuration information may alternatively not include the DU cell ID, but include only the MT carrier ID indicated by the DCI. Alternatively, the first node may ignore the DU cell ID in the second configuration information. In this case, the resource availability information indicated by the DCI is applicable to all DU cells, or any one or more DU cells.

For example, when the second configuration information includes only the MT carrier or the serving cell ID, or when the first node ignores the DU cell ID, the availability states are explained as follows.

The availability state 1 indicates that the impact on the MT carrier (for example, the first carrier) does not need to be considered when the availability of the soft resource is determined for all or any one of the DU cells. That is, for the available state 1, the second node does not use the first carrier of the MT to perform backhaul link scheduling. The availability state 2 indicates that the sending or receiving behavior or the sending or receiving capability of the MT carrier (for example, the first carrier) cannot be affected when the availability of the soft resource is determined for all or any one of the DU cells. That is, for the available state 2, the second node may use the first carrier of the MT to perform backhaul link scheduling. The first carrier of the MT is the MT carrier indicated by the second configuration information.

It should be understood that the solutions in embodiments of this application may be properly combined for use, and explanations or descriptions of terms in embodiments may be cross-referenced or explained in embodiments. This is not limited.

It should be further understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

It may be understood that, to implement functions in any one of the foregoing embodiments, a network device (for example, the first node and the second node) includes a corresponding hardware structure and/or software module for performing each function. A person skilled in the art should be easily aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional modules of the network device such as the first node and the second node may be divided. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is merely an example, and is merely a logical function division. In actual implementation, another division manner may be used.

Figure 12:
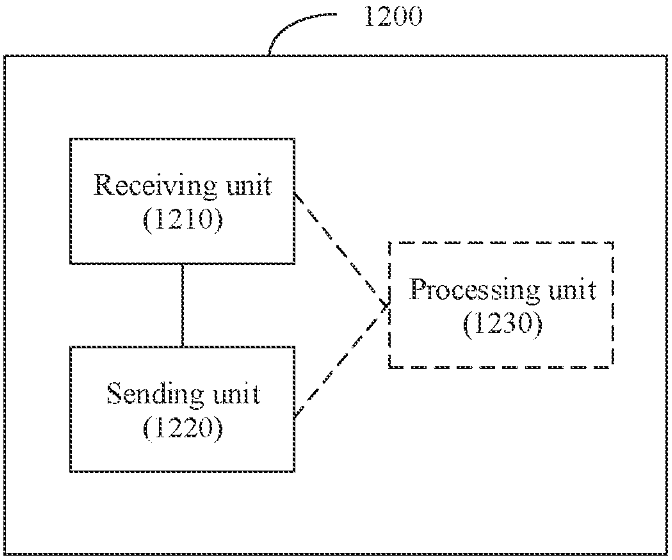
FIG. 12 is a block diagram of a structure of a network device (such as a first node or a second node) according to an embodiment of this application.

For example, when each functional module is obtained through division in an integrated manner, FIG. 12 is a block diagram of a structure of a network device according to an embodiment of this application. A network device 1200 may be the first node or the second node in this application. The network device 1200 may include a receiving unit 1210 and a sending unit 1220.

When the network device 1200 is the first node, the sending unit 1220 is configured to support the first node in performing the step S801, and/or another process of the technology described in this specification. The receiving unit 1210 is configured to support the first node in performing the step S802, S1101 or S1102, and/or another process of the technology described in this specification. When the network device 1200 is the second node, the sending unit 1220 is configured to support the second node in performing the step S802, S1101 or S1102, and/or another process of the technology described in this specification. The receiving unit 1210 is configured to support the first node in performing the step S801, and/or another process of the technology described in this specification.

It should be noted that the receiving unit 1210 and the sending unit 1220 may include a radio frequency circuit. Specifically, the network device (for example, the first node or the second node) may receive and send a radio signal via the radio frequency circuit. The radio frequency circuit usually includes but is not limited to an antenna, at least one amplifier, a transceiver, a coupler, a low noise amplifier, a duplexer, and the like. In addition, the radio frequency circuit may further communicate with another device through wireless communication. The wireless communication may use any communication standard or protocol, including but not limited to a global system for mobile communications, a general packet radio service, code division multiple access, wideband code division multiple access, long term evolution, an email, a short message service, and the like.

In an optional implementation, as shown in FIG. 12, the network device 1200 may further include a processing unit 1230. When the network device 1200 is the first node, the processing unit 1230 may be configured to: determine a resource multiplexing manner, determine information about an MT transmission parameter requirement, or analyze availability of an MT resource and/or a DU resource, and/or perform another process of the technology described in this specification. When the network device 1200 is the second node, the processing unit 1230 may be configured to: allocate or configure an MT resource and/or a DU resource, and/or perform another process of the technology described in this specification.

It should be understood that the network device 1200 according to this embodiment of this application may correspond to the method of the first node or the second node in the foregoing method embodiments, for example, the method in FIG. 8 or FIG. 11. In addition, the foregoing and other management operations and/or functions of each module in the network device 1200 are respectively used to implement corresponding steps of the method of the first node or the second node in the foregoing method embodiments. Therefore, beneficial effects in the foregoing method embodiments can also be implemented. For brevity, details are not described herein again.

It should be further understood that each module in the network device 1200 may be implemented in a form of software and/or hardware. This is not specifically limited herein. In other words, the network device 1200 is presented in a form of a functional module. The "module" herein may be an application-specific integrated circuit ASIC, a circuit, a processor and a memory that execute one or more software or firmware programs, an integrated logic circuit, and/or another component that can provide the foregoing functions. Optionally, in a simple embodiment, a person skilled in the art may realize that the network device 1200 may be in a form shown in FIG. 13. The processing unit 1230 may be implemented by using a processor 1310 shown in FIG. 13. The receiving unit 1210 and the sending unit 1220 may be implemented by using a transceiver 1320 shown in FIG. 13. Specifically, the processor is implemented by executing a computer program stored in a memory. Optionally, when the network device 1200 is a chip, functions and/or implementation processes of the receiving unit 1210 and the sending unit 1220 may alternatively be implemented by using a pin, a circuit, or the like. Optionally, the memory is a storage unit in the chip, for example, a register or a cache. Alternatively, the storage unit may be a storage unit that is in a computer device and that is located outside the chip, for example, a memory 1330 shown in FIG. 13.

Figure 13:
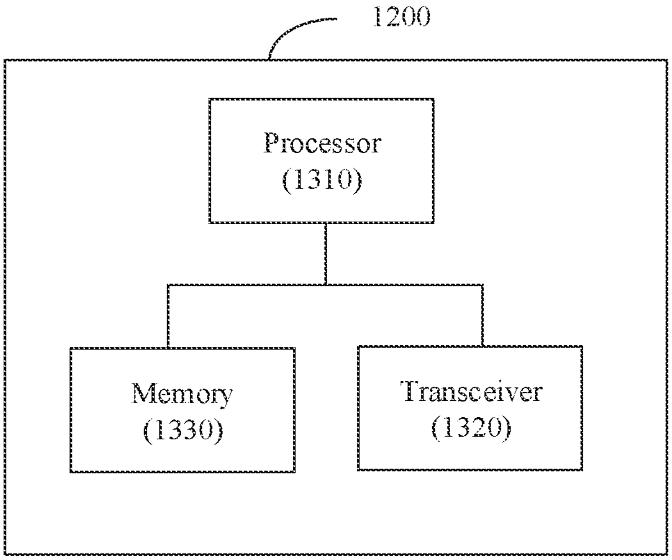
FIG. 13 is a schematic diagram of a structure of a network device (such as a first node or a second node) according to an embodiment of this application.

FIG. 13 is a schematic diagram of a structure of a network device 1200 (such as a first node or a second node) according to an embodiment of this application. As shown in FIG. 13, the network device 1200 includes the processor 1310 and the transceiver 1320.

When the network device 1200 is the first node, the processor 1310 may be configured to support the first node in determining a resource multiplexing manner, determining information about an MT transmission parameter requirement, or analyzing availability of an MT resource and/or a DU resource, and/or performing another process of the technology described in this specification. The transceiver 1320 may be configured to support the first node in performing the step S801, S802, S1101 or S1102, and/or another process of the technology described in this specification. When the network device 1200 is the second node, the processor 1310 may be configured to: allocate or configure an MT resource and/or a DU resource, and/or perform another process of the technology described in this specification. The transceiver 1320 may be configured to support the second node in performing the step S801, S802, S1101 or S1102, and/or another process of the technology described in this specification.

Optionally, the network device 1200 further includes the memory 1330. The memory 1330 may store program code in the foregoing method embodiments, so that the processor 1310 invokes the program code.

Specifically, if the network device 1200 includes the processor 1310, the memory 1330, and the transceiver 1320, the processor 1310, the memory 1330, and the transceiver 1320 communicate with each other through an internal connection path, to transmit a control signal and/or a data signal. In a possible design, the processor 1310, the memory 1330, and the transceiver 1320 may be implemented by using a chip. The processor 1310, the memory 1330, and the transceiver 1320 may be implemented in a same chip, or may be separately implemented in different chips, or any two of the functions are combined and implemented in one chip. The memory 1330 may store program code, and the processor 1310 invokes the program code stored in the memory 1330, to implement a corresponding function of the network device 1200.

In an optional manner, when software is used to implement data transmission, the data transmission may be implemented completely or partially in a form of a computer program product. The computer program product includes one or more computer instructions. When the computer program instructions are loaded and executed on a computer, the procedure or functions according to embodiments of this application are all or partially implemented. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like.

Method or algorithm steps described in combination with embodiments of this application may be implemented by hardware, or may be implemented by a processor by executing software instructions. The software instructions may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other form well-known in the art. For example, a storage medium is coupled to a processor, so that the processor can read information from the storage medium or write information into the storage medium. Certainly, the storage medium may further be a component of the processor. The processor and the storage medium may be located in an ASIC. In addition, the ASIC may be located in a detection apparatus. Certainly, the processor and the storage medium may alternatively exist in the detection apparatus as discrete components.

Based on the foregoing descriptions of the implementations, a person skilled in the art may clearly understand that for the purpose of convenient and brief descriptions, division into the foregoing functional modules is merely used as an example for description. During actual application, the foregoing functions can be allocated to different functional modules for implementation based on a requirement, that is, an inner structure of an apparatus is divided into different functional modules to implement all or some of the functions described above.

In an optional manner, this application provides a communication system. The communication system includes a first node and a second node. The communication system is configured to implement the resource configuration method according to any one of the possible implementations provided in this application.

In an optional manner, this application provides a chip system. The chip system includes a processor and a memory. The memory stores instructions. When the instructions are executed by the processor, the resource configuration method according to any one of the possible implementations provided in this application is implemented. The chip system may include a chip, or may include a chip and another discrete component.

In the several embodiments provided in this application, it should be understood that the disclosed user equipment and method may be implemented in other manners. For example, the described apparatus embodiments are merely examples. For example, division into the modules or units is merely logical function division. During actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, the part contributing to a conventional technology, or all or some of the technical solutions may be implemented in a form of a software product. The software product is stored in a storage medium and includes several instructions for enabling a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A resource configuration method, wherein the method comprises:

sending, by a first node, first information and second information to a second node, wherein the first information indicates a resource multiplexing capability supported by one or more carriers of a mobile termination (MT) of the first node and one or more cells of a distributed unit (DU) of the first node, and wherein the resource multiplexing capability is a restricted resource multiplexing capability that is used when at least one condition is met, and wherein at least one condition of the restricted resource multiplexing capability comprises a maximum quantity of demodulation reference signal (DMRS) ports for downlink scheduling of the MT, a maximum quantity of DMRS ports for uplink scheduling of the MT, and an uplink transmit beam ID supported by the MT or a downlink receive beam ID supported by the MT, and wherein the second information indicates the at least one condition, and wherein the resource multiplexing capability comprises a capability 1, a capability 2, a capability 3, and a capability 4, wherein the capability 1 indicates that the MT and the DU can send a signal simultaneously, the capability 2 indicates that the DU can receive a signal while the MT sends a signal, the capability 3 indicates that the DU can send a signal while the MT receives a signal, and the capability 4 indicates that the MT and the DU can receive a signal simultaneously.

2. The method according to claim 1, wherein the method further comprises:

receiving, by the first node, first configuration information from the second node, wherein the first configuration information indicates a transmission resource of the MT; and the transmission resource of the MT enables the MT to support one of the capability 1, the capability 2, the capability 3, or the capability 4, and the transmission resource of the MT enables the MT to meet a condition required for the capability 1, the capability 2, the capability 3, or the capability 4.

3. The method according to claim 1, wherein the at least one condition of the restricted resource multiplexing capability comprises a timing mode for uplink scheduling of the MT set to a specific mode.

4. The method according to claim 1, wherein the at least one condition of the restricted resource multiplexing capability comprises one or more of the following conditions:

an uplink receive power of the DU set in a specific interval;

a downlink transmit power of the DU set in a specific interval;

a timing mode for uplink receiving of the DU set to a specific mode;

a downlink transmit beam ID supported by the DU;

an uplink receive beam ID supported by the DU; or a downlink receive power of the MT set in a specific interval.

5. The method according to claim 1, wherein the method further comprises:

receiving, by the first node, second configuration information from the second node, wherein the second configuration information comprises:

a DU cell ID indicated by downlink control information (DCI);

a location of DU cell resource availability information in the DCI; and the DU cell resource availability information.

6. A resource configuration method, wherein the method comprises:

receiving, by a second node, first information and second information from a first node, wherein the first information indicates a resource multiplexing capability supported by one or more carriers of a mobile termination (MT) of the first node and one or more cells of a distributed unit (DU) of the first node, and wherein the resource multiplexing capability is a restricted resource multiplexing capability that is used when at least one condition is met, and wherein at least one condition of the restricted resource multiplexing capability comprises a maximum quantity of demodulation reference signal (DMRS) ports for downlink scheduling of the MT, a maximum quantity of DMRS ports for uplink scheduling of the MT, and an uplink transmit beam ID supported by the MT or a downlink receive beam ID supported by the MT, and wherein the second information indicates the at least one condition, and the resource multiplexing capability comprises a capability 1, a capability 2, a capability 3, and a capability 4, wherein the capability 1 indicates that the MT and the DU can send a signal simultaneously, the capability 2 indicates that the DU can receive a signal while the MT sends a signal, the capability 3 indicates that the DU can send a signal while the MT receives a signal, and the capability 4 indicates that the MT and the DU can receive a signal simultaneously.

7. The method according to claim 6, wherein the method further comprises:

sending, by the second node, first configuration information to the first node, wherein the first configuration information indicates a transmission resource of the MT; and the transmission resource of the MT enables the MT to support one of the capability 1, the capability 2, the capability 3, or the capability 4, and the transmission resource of the MT enables the MT to meet a condition required for the capability 1, the capability 2, the capability 3, or the capability 4.

8. The method according to claim 6, wherein the at least one condition of the restricted resource multiplexing capability comprises a timing mode for uplink scheduling of the MT set to a specific mode.

9. The method according to claim 6, wherein the at least one condition of the restricted resource multiplexing capability comprises one or more of the following conditions:

an uplink receive power of the DU set in a specific interval;

a downlink transmit power of the DU set in a specific interval;

a timing mode for uplink receiving of the DU set to a specific mode;

a downlink transmit beam ID supported by the DU;

an uplink receive beam ID supported by the DU; or a downlink receive power of the MT set in a specific interval.

10. The method according to claim 6, wherein the method further comprises:

sending, by the second node, second configuration information to the first node, wherein the second configuration information comprises:

a DU cell ID indicated by downlink control information (DCI);

a location of DU cell resource availability information in the DCI; and the DU cell resource availability information.

11. A first node, wherein the first node comprises:

at least one processor; and one or more memories coupled to the at least one processor and storing programming instructions that when executed, cause the first node to perform operations comprising:

sending first information and second information to a second node, wherein the first information indicates a resource multiplexing capability supported by one or more carriers of a mobile termination (MT) of the first node and one or more cells of a distributed unit (DU) of the first node, and wherein the resource multiplexing capability is a restricted resource multiplexing capability that is used when at least one condition is met, and wherein at least one condition of the restricted resource multiplexing capability comprises a maximum quantity of demodulation reference signal (DMRS) ports for downlink scheduling of the MT, a maximum quantity of DMRS ports for uplink scheduling of the MT, and an uplink transmit beam ID supported by the MT or a downlink receive beam ID supported by the MT, and wherein the second information indicates the at least one condition, and wherein the resource multiplexing capability comprises a capability 1, a capability 2, a capability 3, and a capability 4, wherein the capability 1 indicates that the MT and the DU can send a signal simultaneously, the capability 2 indicates that the DU can receive a signal while the MT sends a signal, the capability 3 indicates that the DU can send a signal while the MT receives a signal, and the capability 4 indicates that the MT and the DU can receive a signal simultaneously.

12. The first node according to claim 11, wherein the operations further comprise:

receiving first configuration information from the second node, wherein the first configuration information indicates a transmission resource of the MT; and the transmission resource of the MT enables the MT to support one of the capability 1, the capability 2, the capability 3, or the capability 4, and the transmission resource of the MT enables the MT to meet a condition required for the capability 1, the capability 2, the capability 3, or the capability 4.

13. The first node according to claim 11, wherein the at least one condition of the restricted resource multiplexing capability comprises a timing mode for uplink scheduling of the MT set to a specific mode.

14. The first node according to claim 11, wherein the at least one condition of the restricted resource multiplexing capability comprises one or more of the following conditions:

an uplink receive power of the DU set in a specific interval;

a downlink transmit power of the DU set in a specific interval;

a timing mode for uplink receiving of the DU set to a specific mode;

a downlink transmit beam ID supported by the DU;

an uplink receive beam ID supported by the DU; or a downlink receive power of the MT set in a specific interval.

15. The first node according to claim 11, wherein the operations further comprise:

receiving second configuration information from the second node, wherein the second configuration information comprises:

a DU cell ID indicated by downlink control information (DCI);

a location of DU cell resource availability information in the DCI; and the DU cell resource availability information.

16. A second node, wherein the second node comprises:

at least one processor; and one or more memories coupled to the at least one processor and storing programming instructions that when executed, cause the second node to perform operations comprising:

receiving first information and second information from a first node, wherein the first information indicates a resource multiplexing capability supported by one or more carriers of a mobile termination (MT) of the first node and one or more cells of a distributed unit (DU) of the first node, and wherein the resource multiplexing capability is a restricted resource multiplexing capability that is used when at least one condition is met, and wherein at least one condition of the restricted resource multiplexing capability comprises a maximum quantity of demodulation reference signal (DMRS) ports for downlink scheduling of the MT, a maximum quantity of DMRS ports for uplink scheduling of the MT, and an uplink transmit beam ID supported by the MT or a downlink receive beam ID supported by the MT, and wherein the second information indicates the at least one condition, and the resource multiplexing capability comprises a capability 1, a capability 2, a capability 3, and a capability 4, wherein the capability 1indicates that the MT and the DU can send a signal simultaneously, the capability 2indicates that the DU can receive a signal while the MT sends a signal, the capability 3 indicates that the DU can send a signal while the MT receives a signal, and the capability 4 indicates that the MT and the DU can receive a signal simultaneously.

17. The second node according to claim 16, wherein the operations further comprise sending first configuration information to the first node, wherein the first configuration information indicates a transmission resource of the MT; and the transmission resource of the MT enables the MT to support one of the capability 1, the capability 2, the capability 3, or the capability 4, and the transmission resource of the MT enables the MT to meet a condition required for the capability 1, the capability 2, the capability 3, or the capability 4.

18. The second node according to claim 17, wherein the at least one condition of the restricted resource multiplexing capability comprises a timing mode for uplink scheduling of the MT set to a specific mode.

19. The second node according to claim 17, wherein the at least one condition of the restricted resource multiplexing capability comprises one or more of the following conditions:

an uplink receive power of the DU set in a specific interval;

a downlink transmit power of the DU set in a specific interval;

a timing mode for uplink receiving of the DU set to a specific mode;

a downlink transmit beam ID supported by the DU;

an uplink receive beam ID supported by the DU; or a downlink receive power of the MT set in a specific interval.

20. The second node according to claim 18, wherein the operations further comprise:

sending second configuration information to the first node, wherein the second configuration information comprises:

a DU cell ID indicated by downlink control information (DCI);

a location of DU cell resource availability information in the DCI; and the DU cell resource availability information.

* * * * *